(12) United States Patent
Wenig et al.

(10) Patent No.: US 6,286,098 B1
(45) Date of Patent: Sep. 4, 2001

(54) SYSTEM AND METHOD FOR ENCRYPTING AUDIT INFORMATION IN NETWORK APPLICATIONS

(75) Inventors: Robert Wenig, Mill Valley; Igor Tsyganskiy, Mountain View, both of CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 09/143,537

(22) Filed: Aug. 28, 1998

(51) Int. Cl.⁷ ............................................... H04L 9/32
(52) U.S. Cl. ......................................................... 713/151
(58) Field of Search .................................. 713/151, 154; 705/75, 78

(56) References Cited

U.S. PATENT DOCUMENTS

| | | | |
|---|---|---|---|
| 5,463,547 | 10/1995 | Markowitz et al. | 364/408 |
| 5,825,880 | * 10/1998 | Sudia et al. | 713/180 |
| 5,832,458 | * 11/1998 | Jones | 705/14 |
| 5,848,396 | 12/1998 | Gerace | 705/10 |
| 5,867,578 | * 2/1999 | Brickell et al. | 713/180 |
| 5,903,652 | * 5/1999 | Mital | 705/78 |

FOREIGN PATENT DOCUMENTS

| | | |
|---|---|---|
| 0 843 449 | 5/1998 | (GB) . |
| WO 98/25372 | 6/1998 | (WO) . |
| WO 98/36520 | 8/1998 | (WO) . |
| WO 00/13371 | 3/2000 | (WO) . |

OTHER PUBLICATIONS

Matt Bishop, A Model of Security Monitoring, IEEE Department of Mathematics and Computer Science, 1999, pp. 46–52.
XP–002128785, "Cryptographic Initialization Test," IBM Technical Disclosure Bulletin, 33:195–198, 1991.

* cited by examiner

*Primary Examiner*—Tod Swann
*Assistant Examiner*—Matthew Smithers
(74) *Attorney, Agent, or Firm*—Finnegan, Henderson, Farabow, Garrett & Dunner L.L.P.

(57) ABSTRACT

A system and method for auditing network applications captures transmissions during a user session between a client and a server. An auditor capture filter captures each request from the client and each response by the server to each request. An auditor encryption module encrypts the captured requests and the captured responses with an encryption key and stores them in an auditor storage. The auditor encryption module also distributes portions of the encryption key to the client and the server. An auditor decryption module collects the portions of the encryption key from the client and the server and decrypts the encrypted requests and the encrypted responses. An auditor analyzer may then use the decrypted requests and the decrypted responses to recreate the user session to thereby analyze what transpired during the user session. In addition, the analyzer may also verify that a particular event occurred during the user session.

13 Claims, 20 Drawing Sheets

DIMENSION BUFFER

SYSTEM AND METHOD FOR ENCRYPTING AUDIT INFORMATION IN NETWORK APPLICATIONS

BACKGROUND OF THE INVENTION

1. Field of the Invention

The present invention relates to a system and method for encrypting audit information in network applications. More particularly, the present invention relates to a system and method for encrypting and storing information transmitted between a client and a server environment during a user session that can be used to recreate the user session or to later verify that a particular event occurred during the user session.

2. Discussion of the Related Art

In a network application, also referred to as a client/server application, a client requests information from a server. In response to each request, the server provides information to the client. A typical server may be responding to several hundred clients at one time, while the client may access several servers intermittently and over a very short period of time. As a result of the very dynamic nature of such applications, problems associated with the application are difficult to isolate, repeat, and/or diagnose. Furthermore, such problems are difficult to attribute to either the server or the client.

Another problem associated with network applications, particularly those dealing in electronic commerce ("e-commerce"), is that the precise behavior of the purchaser during the transaction is difficult to ascertain and even more difficult to evaluate or understand. For example, website developers may wish to understand how a particular buyer using an e-commerce application navigates through the website to purchase an item. Given the nature of conventional network applications, such understanding is difficult to obtain.

Yet another problem associated with network applications, particularly those where data associated with the user session is stored is security and privacy. Clients may be adverse to data regarding their users sessions being stored. Servers may be adverse to information regarding their clients' and their associated behavior susceptible to access by competitors.

Still yet another problem associated with network applications is that clients and servers are unable to verify or prove that certain events (e.g., purchases, etc.) occurred during a particular user session.

Other problems exists with network applications, some of which are discussed in further detail below. A need exists for a system and method for auditing network applications that solves the problems described herein.

SUMMARY OF THE INVENTION

Accordingly, the present invention is directed to a system and method for encrypting audit information in network application. In particular, the present invention captures requests and responses sent between a client and a server during a particular user session of a network application. The present invention encrypts either the entire user session or portions of the user session to maintain privacy, provide security, and/or permit verification of the events that occurred during the user session. The present invention stores the encrypted user session (or portion thereof) in an auditor storage. The present invention distributes the key used to encrypt the user session to the participants. Subsequently, the present invention retrieves the user session from the auditor storage, retrieves the necessary keys from participants, and decrypts the user session.

One of the features of the present invention is that a user session, or a portion thereof, is privately and securely stored in the auditor storage. In one embodiment, the user session can only be decrypted with the knowledge and permission of each of the participants to the user session much like a safety deposit box.

Another feature of the present invention is that particular events can be verified as having occurred during the user session. In other words, a client can show that, for example, he performed a particular transaction (e.g., made an electronic purchase) during the user session. The client does so by providing the server or an appropriate third party information that corresponds to and demonstrates the occurrence of a particular event during the user session.

Additional features and advantages of the present invention will be set forth in the description which follows, and in part will be apparent from the description, or may be learned by practice of the invention. The objectives and other advantages of the invention will be realized and attained by the process particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
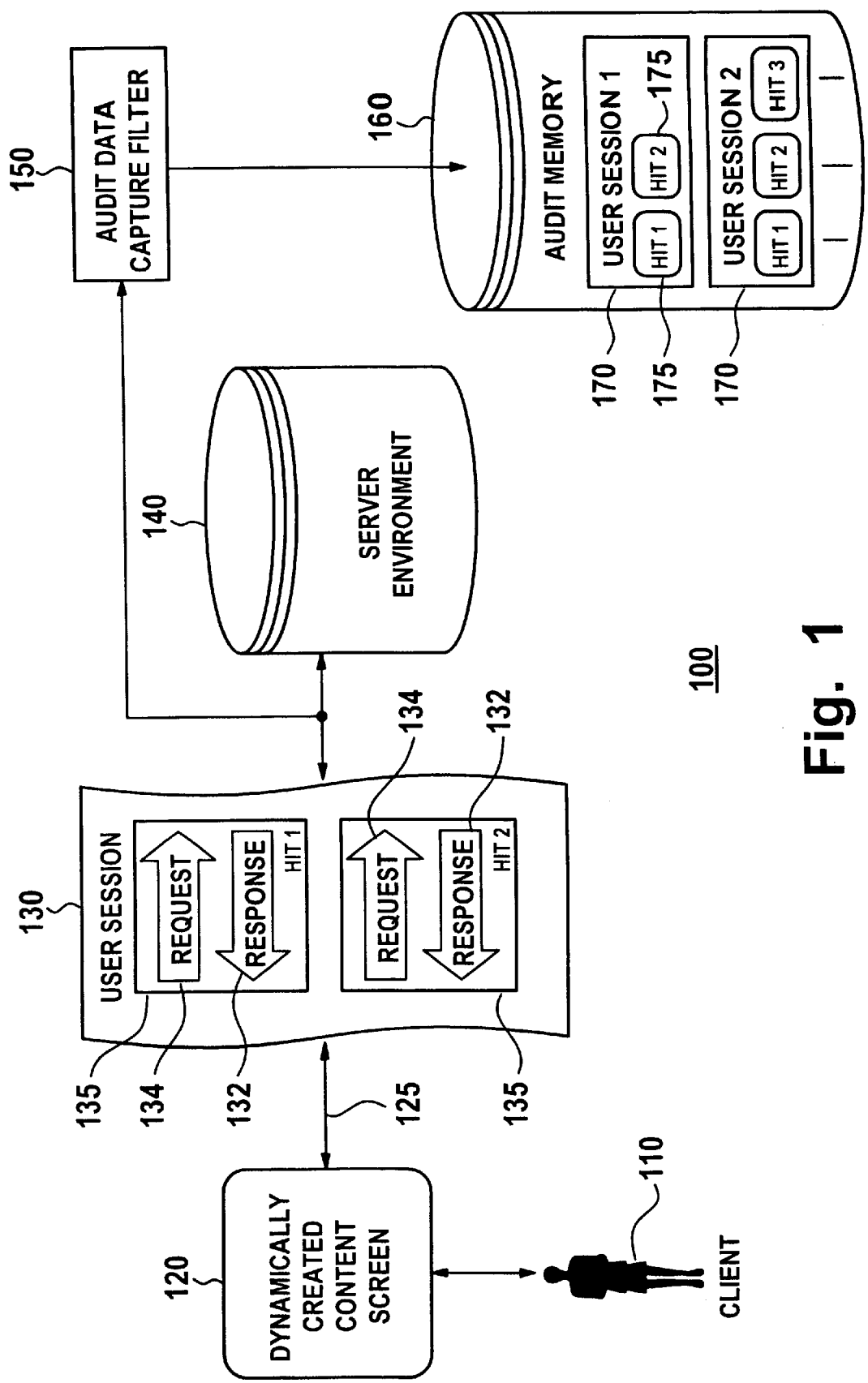
FIG. 1 illustrates an embodiment of the present invention capturing session data in a client/server environment.

In a client/server environment 100, such as that illustrated in FIG. 1, a client 110 communicates with a server environment 140 through a communication link 125. As would be understood, server environment 140 may comprise a single network server or several servers acting in conjunction with one another.

A particular set of related communications between client 110 and server environment 140 is referred to as a user session 130. User session 130 includes a series of requests 134 made by client 110 to server environment 140, and a series of responses 132 from server environment 140 to client 110 in response to requests 134. A particular request 134 and its associated response 132 is referred to herein as a hit 135 or alternatively as a request/response pair. During user session 130, client 110 may access server environment 140 in any of several manners, as is known in the art.

Client 110 accesses server environment 140 through a dynamically generated screen 120 which displays information to client 110 from server environment 140 for a particular network application. Based on requests 134 and responses 132, server environment 140 provides information to update dynamically generated screen 120. According to one embodiment of the present invention, dynamically generated screen 120 is generated by a work station (not shown) of client 110 based on information included in response 132 from server environment 140. In one embodiment of the present invention, dynamically generated screen 120 is generated by the work station based on a response 132 that includes a markup language such as HTML, XML, SGML, etc., used in various client/server environments 100. In an alternate embodiment of the present invention, dynamically generated screen 120 is generated by a work station of client 110 based on a response 132 that includes information compatible with formats utilized in a dedicated on-line environment such as a SAP R/3 environment.

The following discussion is based on client/server environment 100 operating in an Internet or Web-based environment. However, it should be understood that the present invention also contemplates a system where client 110 is hard-wired directly to server environment 140, such as in the SAP R/3 environment. It will be apparent to one skilled in the art how the following discussion applies to such hard-wired or "dedicated" systems.

According to the present invention, an auditor capture filter 150 monitors communication link 125 to capture communications (i.e., requests 134 and responses 132) between client 110 and server environment 140. In particular, auditor capture filter 150 captures request 134 from client 110 to server environment 140 and captures response 132 from server environment 140 to client 110. In one embodiment of the present invention, auditor capture filter 150 captures request 134 from communication link 125 after server environment 140 has received request 134 but before server environment 140 has processed request 134. In this embodiment of the present invention, auditor capture filter 150 captures response 132 after server environment 140 has processed request 134 and determined response 132 but prior to server environment 140 sending response 132. It should be understood that the capturing function of a preferred auditor capture filter 150 does not interfere with or interrupt communication between client 100 and server environment 140.

In the embodiment of the present invention just described, server environment 140 would include the necessary modifications to provide auditor capture filter 150 with access to requests 134 and responses 132. In other words, server environment 140 would provide auditor capture filter 150 with the necessary hooks to the session data as would be apparent. In this embodiment, auditor capture filter 150 captures requests 134 and responses 132 with the cooperation and possibly the active participation of server environment 140.

In an alternate embodiment of the present invention, auditor capture filter 150 would not require the modifications to server environment 140 discussed above. In this alternate embodiment of the present invention, auditor capture filter 150 would capture requests 134 and responses 132 directly from communication link 125 and server environment 140 would function without regard to the presence of auditor capture filter 150.

Auditor capture filter 150 stores captured request 134 and captured response 132 in an auditor storage 160. In a preferred embodiment of the present invention, captured request 134 and captured response 132 are stored as a hit 135. Auditor storage 160 includes a storage device such as a disk drive, a RAM, a database or other such memory device as would be apparent. In some preferred embodiments of the present invention, auditor storage 160 stores all hits 135 in a particular user session 130 as stored hits 175 in a stored user session 170. In other words, in these embodiments of the present invention, the series of captured requests 134 and captured responses 132 that comprise a particular user session 130 are stored collectively as stored user session 170.

In one embodiment of the present invention, user session 130 is conducted over an Internet. As such, after each transmission, (i.e., after each request 134 from client 110 to server environment 140 and after each response 132 from server environment 140 to client 110) client 110 and server environment 140 are not in active communication (i.e., they are effectively disconnected). In such an application, a unique session identification (also referred herein as a state identification) is used to identify a particular client 110 each time the particular client 110 accesses server environment 140. The session identification is sent with each request 134 to uniquely determine the user context. Using the session identification to attribute each request 134 to a particular client 110, server environment 140 is able to handle client 110 over the Internet as if client 110 was continuously connected to server environment 140.

In a second embodiment of the present invention, client 110 and server environment 140 are continuously connected via dedicated communication link 125. In this embodiment of the present invention, a session identification is not necessary for each request 134; rather, the session identification is implicit in each transmission between client 110 and server environment 140 as a result of the dedicated communication link 125.

As discussed above, a series of requests 134 and responses 132 between client 110 and server environment 140 that comprise user session 130 are stored in auditor storage 160 as stored hits 175 in stored user session 170. As discussed in reference to FIG. 2, an analyzer 220 enables an analyst 210 to analyze user session 170. For example, analyst 210 may evaluate user session 170 to determine how client 110 moves through a particular network application to achieve a particular result. Such evaluation is useful, for example, in commercial or e-commerce Internet applications. In these applications, application developers are interested in understanding how a client 110 navigates through a particular application to arrive at a particular result, such as a purchase. As can be appreciated, the present invention permits analyst 210 to evaluate the particular application for different clients 110, at different times, etc.

In another example, analyst 210 may evaluate user session 170 to isolate errors that occurred during user session 130. In this example, analyst 210 can recreate the entire user session 130 in an effort to identify and isolate a problem with a particular network application.

Figure 2:
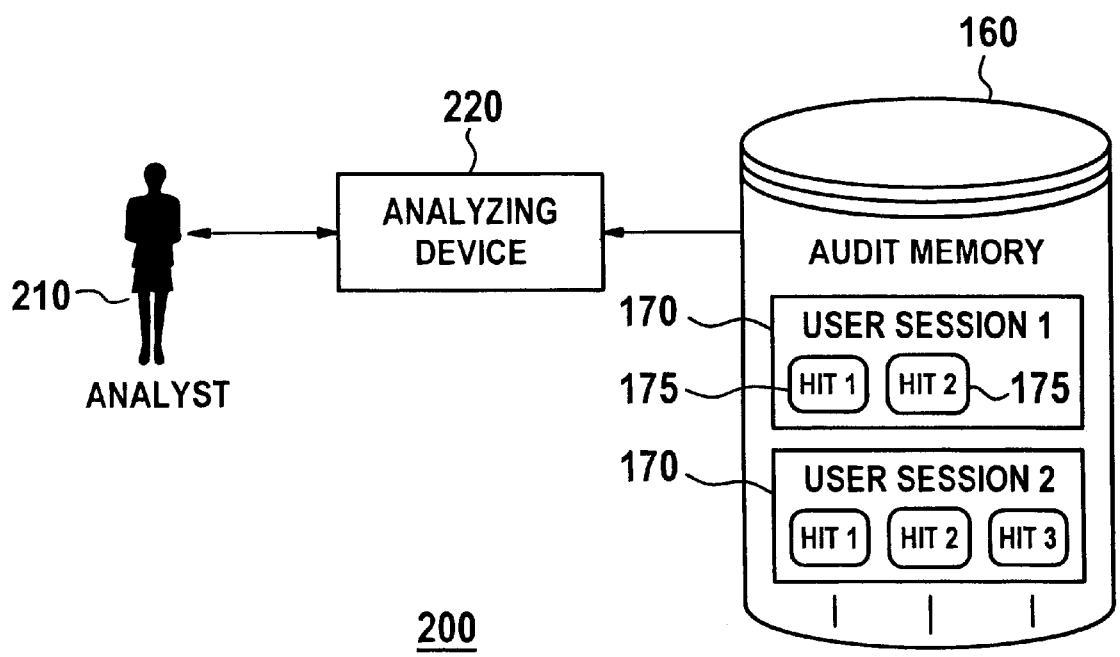
FIG. 2 illustrates an embodiment of the present invention analyzing captured session data in an auditing environment.

As shown at FIG. 2, analyst 210 uses analyzer 220 to access auditor storage 160. In particular, analyst 210 is able to access a particular user session 170 and visually recreate it. In other words, analyst 210 is able to step through the particular user session 170 and individually evaluate each request 134 and each response 132 as it occurred during user session 170. In a preferred embodiment of the present invention, analyzer 220 visually recreates user session 170 by generating the various screens 120 that were presented to client 110 by server environment 140 during user session 130. In this manner, analyst 210 is able to view the identical screens 120 that client 110 viewed during user session 130. Analyst 210 is also able to evaluate any request made by client 110 and evaluate any subsequent response 132 of server environment 140. As would be apparent, analyst 210 may evaluate user session 130 off-line, that is, after user session 170 is complete, or in near real-time, that is, while user session 170 is occurring. In this latter embodiment, analyzer 220 may retrieve hits 175 from auditor storage 160 or directly from auditor capture filter 150 (thereby by passing auditor storage 160).

Figure 3:
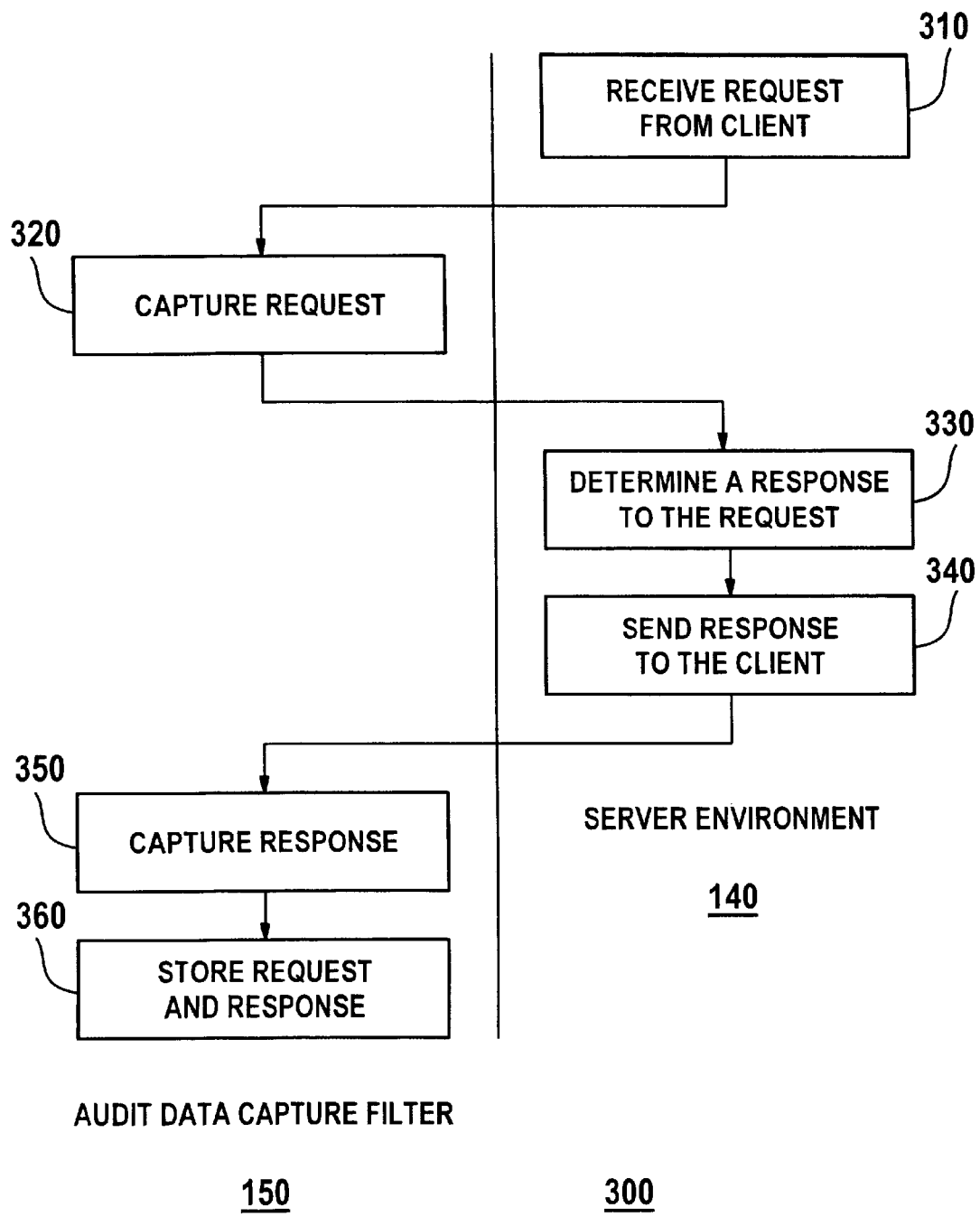
FIG. 3 is a flowchart that illustrates the operation of one embodiment of the present invention as it captures session data.

Having thus described the components of the present invention, the operation of the present invention is now discussed. FIG. 3 is a flowchart that illustrates an operation 300 of auditor capture filter 150 as it captures requests 134 and responses 132 during user session 130 according to one embodiment of the present invention. In a step 310, server environment 140 receives a request 134 from client 110. In a step 320, auditor capture filter 150 captures request 134. In one embodiment of the present invention, auditor capture filter 150 captures request 134 at server environment 140. Specifically, in this embodiment, auditor capture filter 150 captures request 134 from server environment 140 after server environment 140 receives request 134 but prior to server environment 140 processing request 134. In an alternate embodiment of the present invention, server environment 140 may pass request 134 to auditor capture filter 150 as would be apparent. Of course, other mechanisms exist that permit auditor capture filter 150 to gain access to request 134 as would be apparent. In any case, the capture of request 134 does not interfere with or interrupt communication between client 110 and server environment 140.

In an alternate embodiment of the present invention, auditor capture filter 150 captures request 134 directly from communication link 125 without cooperation from or participation with server environment 140.

In a preferred embodiment of the present invention, capturing request 134 includes capturing or determining particular environmental data (not shown) associated with client 110 and server environment 140 at or about the time request 134 was sent or captured. This environmental data includes parameters such as loading, traffic volume, status, or other such information available on communication link 125 and well known in client/server environment 100. As will be discussed below, the environmental data permits analyzer 220 to evaluate the effect of client/server environment 100 on a particular user session 170.

In a step 330, server environment 140 determines a response 132 to request 134 from client 110. In a step 340, server environment 140 sends response 132 to client 110. In a step 350, according to one embodiment of the present invention, auditor capture filter 150 captures response 132 from server environment 140 to client 110. In an alternate embodiment, server environment 140 may pass response 132 to auditor capture filter 150 as would be apparent. In yet another alternate embodiment of the present invention, auditor capture filter 150 captures response 132 directly from communication link 125. Furthermore, as discussed above with respect to capturing request 134, in a preferred embodiment of the present invention, capturing response 132 includes capturing environmental data associated with response 132.

Finally, in a step 360, auditor capture filter 150 stores captured request 134 and captured response 132 as a hit 175 in auditor storage 160. In particular, each hit 175 (or alternately, each request/response pair) is stored in auditor storage 160 together with other hits associated with a particular user session 170.

In an alternate embodiment of the present invention, auditor capture filter 150 stores captured request 134 in auditor storage 160 as soon as it is captured rather than waiting for an associated captured response 132. In other words, captured request 134 and captured response 132 are stored as they are captured.

According to one embodiment of the present invention, auditor capture filter 150 captures or receives requests 134 and/or responses 132 from server environment 140. In fact, in actual implementation, auditor capture filter 150 may reside on and operate in conjunction with server environment 140. With this implementation and according to the present invention, software, hardware, or a combination of software and hardware associated with auditor capture filter 150 is not required at client 110 nor does client 110 require any modifications to the hardware or software residing therein.

In an alternate embodiment of the present invention, auditor capture filter 150 captures requests 134 and responses 132 directly from communication link. In this embodiment of the present invention, software, hardware, or a combination of software and hardware associated with auditor capture filter 150 is not required at either client 110 or server environment 140.

Figure 4:
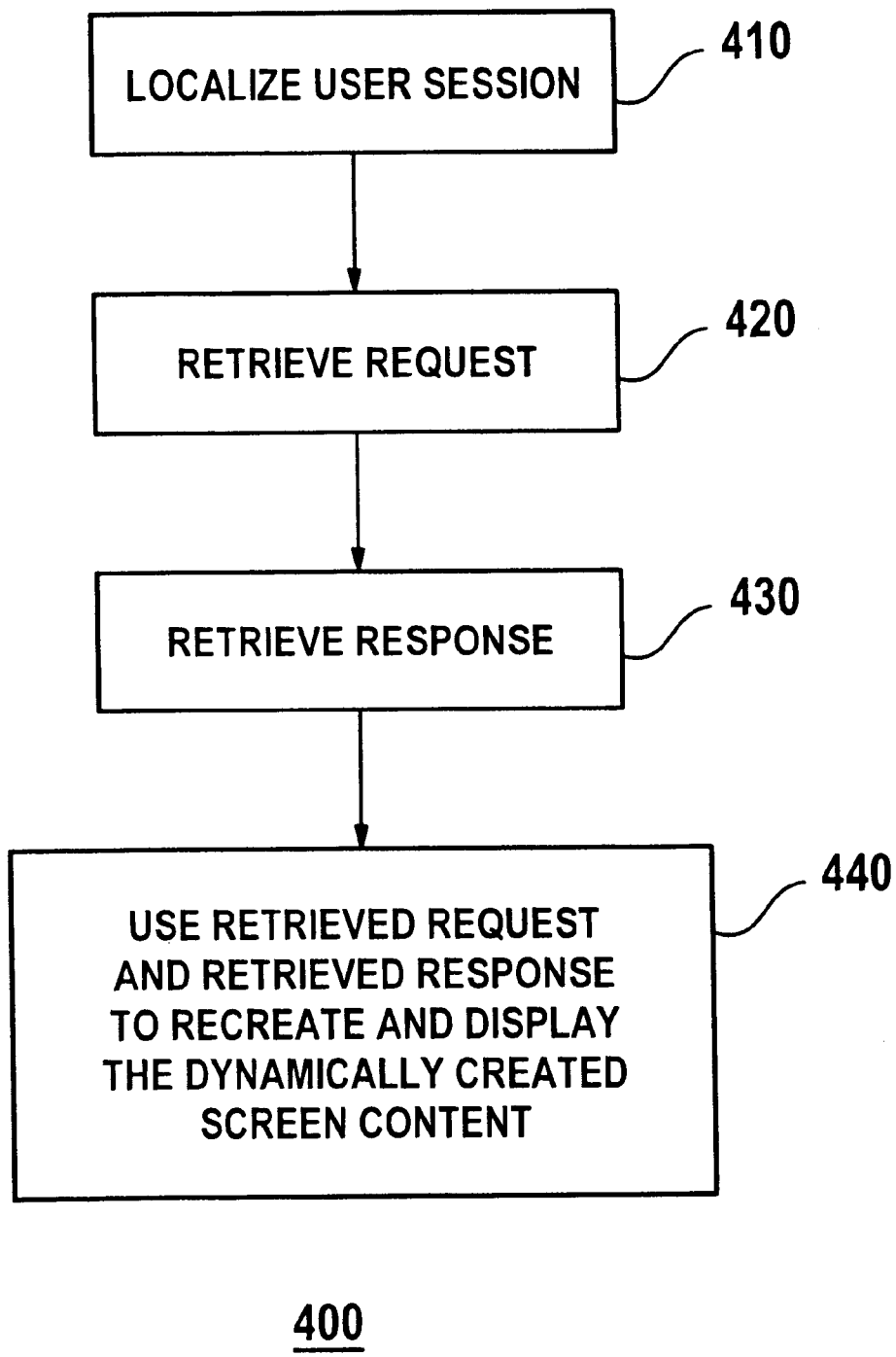
FIG. 4 is a flowchart that illustrates the operation of one embodiment of the present invention as it visually recreates a user session.

FIG. 4 is a flowchart that illustrates the operation 400 of analyzer 220 as it facilitates the analysis of a user session 170 according to one embodiment of the present invention. In a step 410, analyzer 220 locates a particular user session 170 in auditor storage 160. In an alternate embodiment that bypasses auditor storage 160, analyzer 220 specifies to auditor capture filter 150 a particular user session 170 that analyzer 220 wishes to analyze.

User session 170 may be located by any number of mechanisms as would be apparent. Such mechanisms may permit analyzer 220 to access auditor storage 160 according to the date and/or session number which correspond to a particular user session 170 sought. However, such date and session number may not always be known. Hence, analyzer 220 may include other mechanisms for locating user session 170 such as searching auditor storage 160 using key words, identifiers, etc., or any other manner of searching auditor storage 160 as would be apparent to one skilled in the art.

After a particular user session 170 has been located, in a step 420, analyzer 220 retrieves request 134 from auditor storage 160. Likewise, in a step 430, analyzer 220 retrieves response 132 corresponding to request 134 from auditor storage 160. As discussed above, in an alternate embodiment of the present invention, analyzer 220 may retrieve request 134 and response 132 directly from auditor capture filter 150.

In a preferred embodiment of the present invention, when analyzer 220 retrieves request 134 and response 132, analyzer 220 also retrieves associated environmental data that may have been stored with each request 134 and response 132 as discussed above.

In a step 440, analyzer 220 uses the retrieved request and the retrieved response, and in the preferred embodiment, the retrieved environmental data associated with each, to recreate and display the dynamically generated screen 120. In this manner, analyzer 220 is able to present to analyst 210 a dynamically generated screen 120 that is the same as that viewed by client 110 during user session 130.

Figure 5:
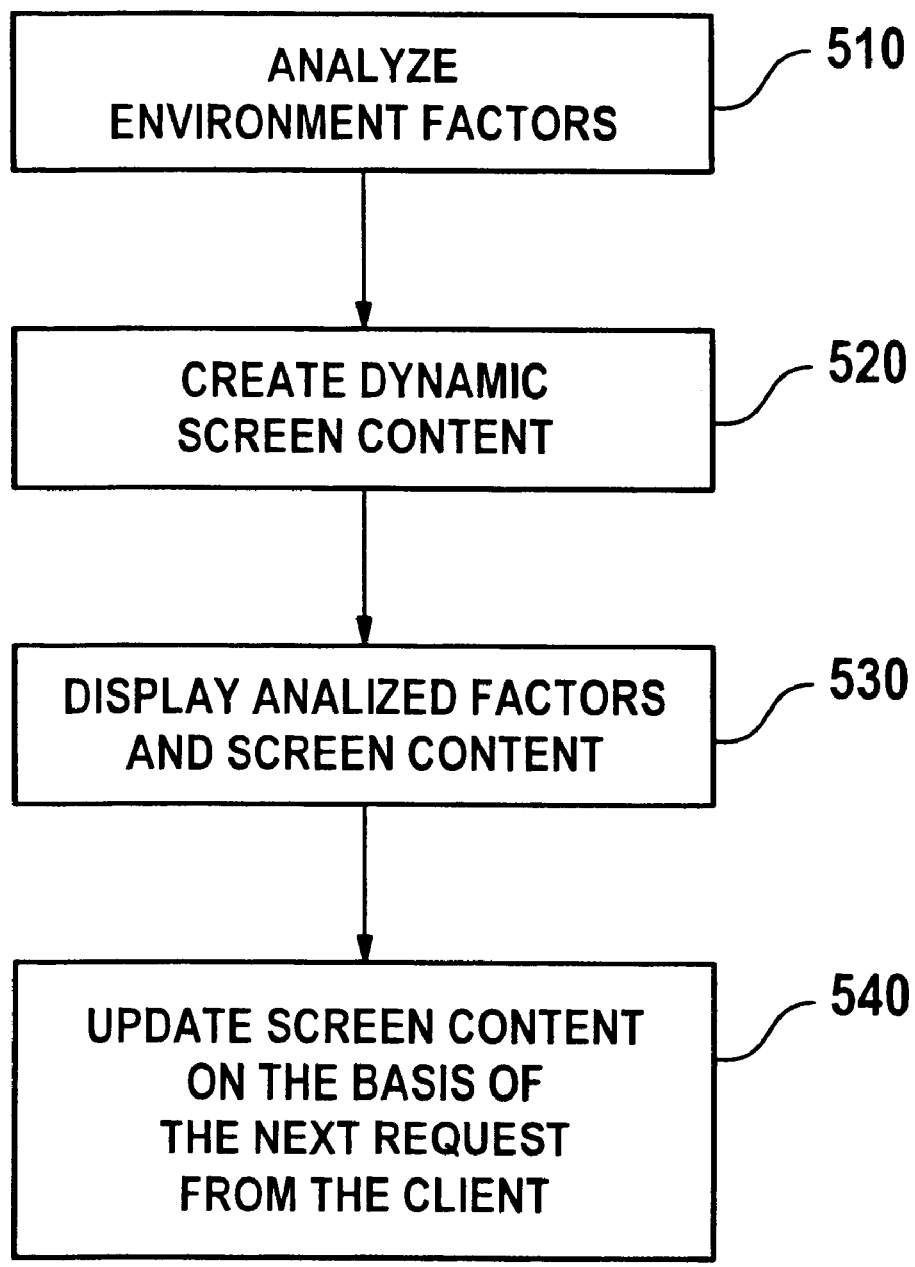
FIG. 5 is a flowchart that illustrates the operation of a preferred embodiment of the present invention as it performs the step of recreating and visually displaying the dynamically generated screen.

FIG. 5 illustrates the operation of a preferred embodiment of step 440 in further detail. In a step 510, analyzer 220 analyzes the environmental data and other factors associated with retrieved request 134 and retrieved response 132. In a step 520, analyzer 220 generates a screen based on retrieved request 134 and retrieved response 132 thereby recreating dynamically generated screen 120. In a step 530, analyzer 220 displays the analyzed environmental data and the generated screen to analyst 210. This permits analyst 210 to view the recreated screen in the context of the environmental factors that may have effected the particular user session 170. In a preferred embodiment of the present invention, in a step 540, the recreated screen is updated to reflect data entered by client 110. This data is obtained from a subsequent request 134 from client 110 to server environment 140 in the particular user session 170.

Figure 6:
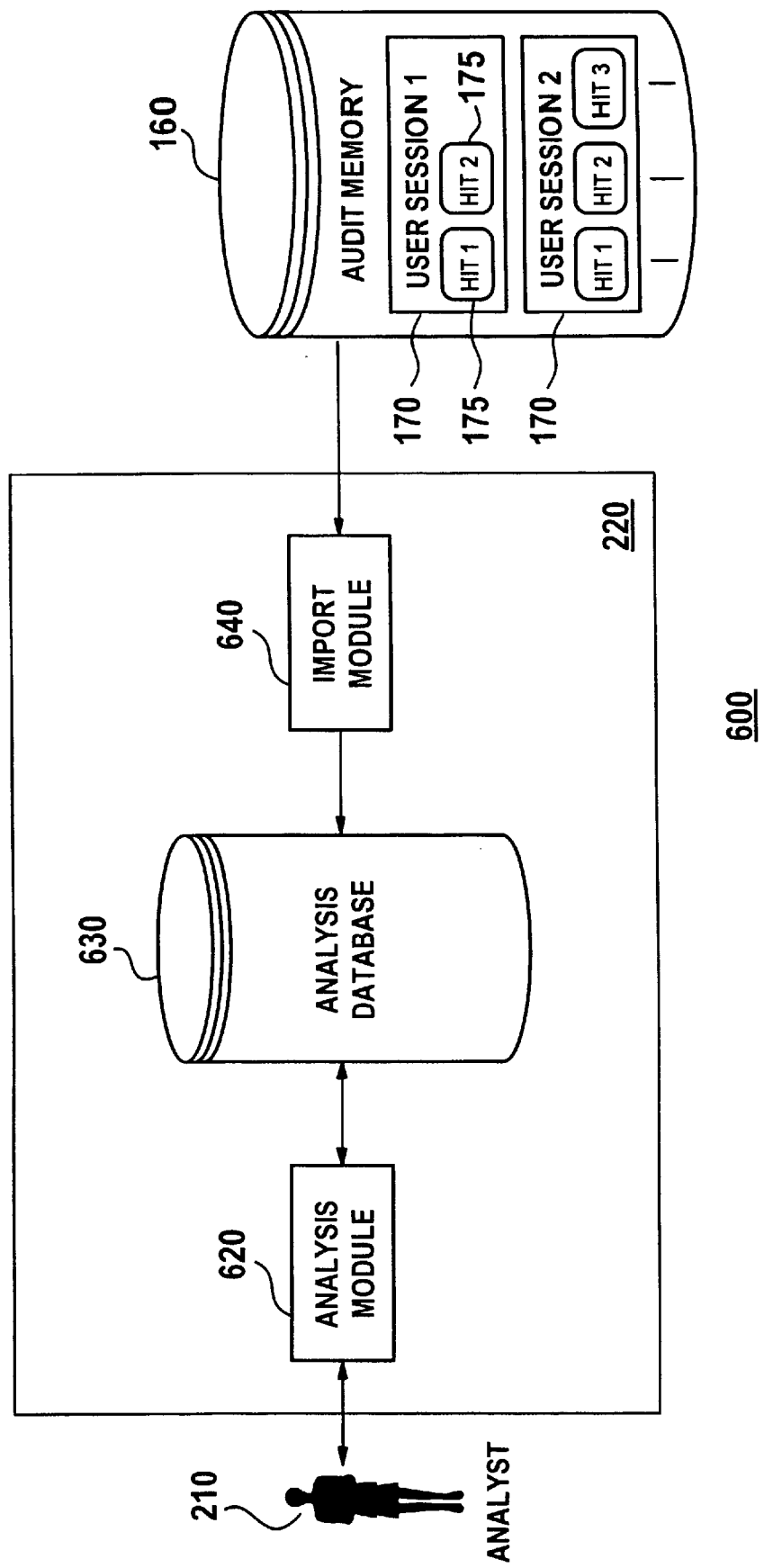
FIG. 6 illustrates an analyzer according to a preferred embodiment of the present invention in further detail.

Analyzer 220 is now discussed in further detail in reference to FIG. 6. Analyzer 220 includes a analyze module 620, an analyzer database 630, and an import module 640. Import module 640 extracts meaningful information out of the raw data of user session 170 stored in auditor storage 160 for use by analyst 210. In a preferred embodiment of the present invention, import module 640 extracts information from hits 175 in user session 170 from auditor storage 160 and stores it in analyzer database 630 in a particular format unique to analyzer database 630. For example, for one application, import module 640 extracts information from hits 175 captured in an Internet environment, while for another application, import module 640 extracts information from hits 175 captured in an SAP R/3 environment. By doing so, import module 640 can extract session data associated with a variety of clients 110 and server environments 140 and combine it into one centralized, uniform database, such as analyzer database 630. Thus, subsequent analysis tools (such as analyze module 620) can analyze session data regardless of the format of captured hits 175. Furthermore, using the common format of analyzer database 630, the subsequent analysis tools can meaningfully compare session data obtained from different clients 110, server environments 140, applications, etc.

In a preferred embodiment of the present invention, data stored in analyzer database 630 includes pertinent data from request 134 and response 132, and the associated environmental data. This data includes information associated with and derived from client 110 and server environment 140 as well as the communication protocols used, and other relevant information that would be apparent to those familiar with various network protocols.

Figure 9:
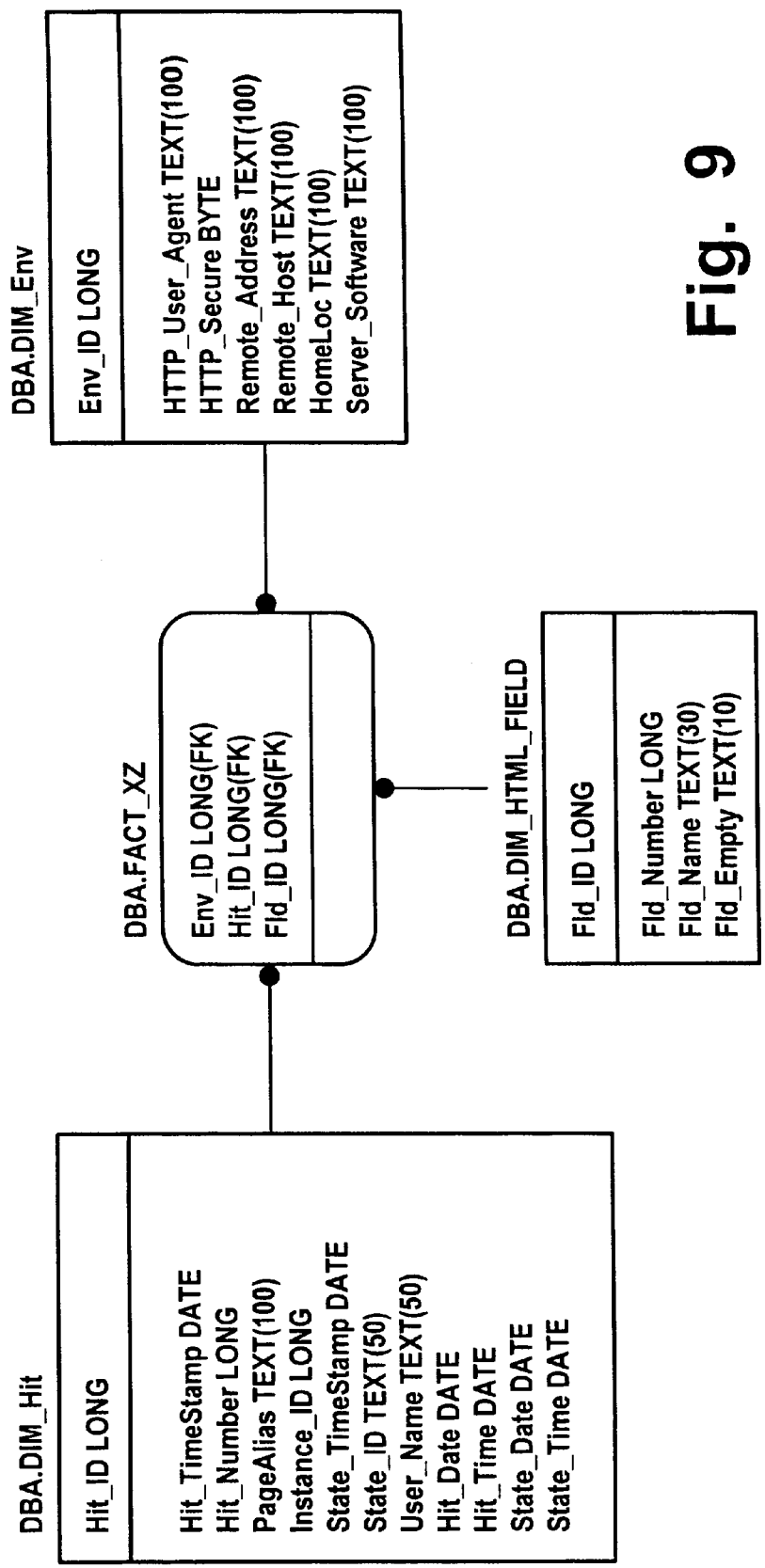
FIG. 9 illustrates a star structure for storing OLAP data for an internet based environment according to one embodiment of the present invention.
Figure 10:
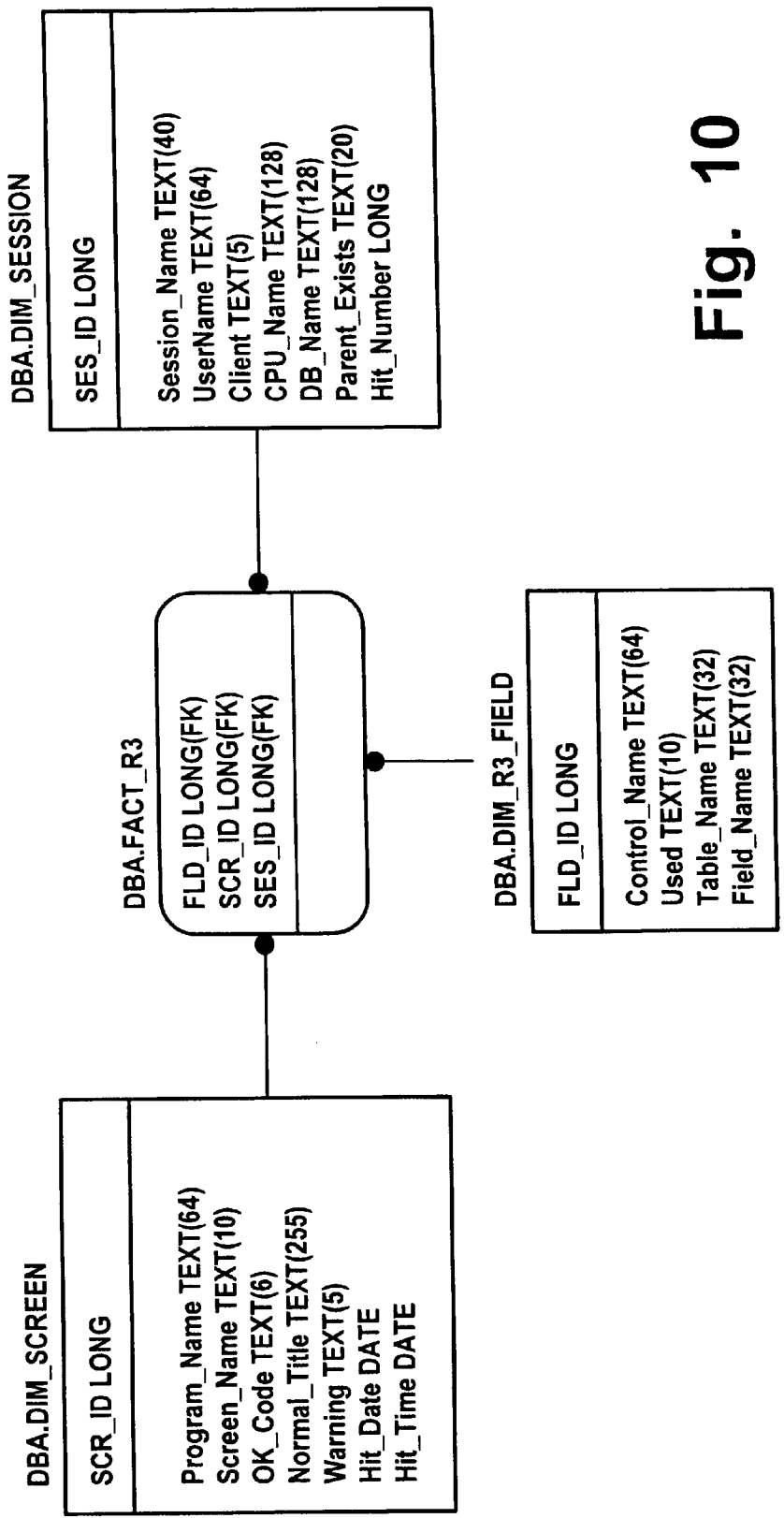
FIG. 10 illustrates a star structure for storing OLAP data for an SAP R/3 environment according to one embodiment of the present invention.

In a preferred embodiment of the present invention, analyzer database 630 includes two sets of tables for each application in client/server environment 100. The first set of tables are referred to as OLAP ("On-line Analytical Processing") analysis tables. The OLAP analysis tables are designed and optimized for preliminary OLAP analysis. In a preferred embodiment of the present invention, the OLAP analysis tables have a star-scheme structure and are fully indexed. FIG. 9 illustrates a preferred embodiment for a star structure for hits captured in an Internet or Web-based environment, while FIG. 10 illustrates a preferred embodiment for a star structure for hits captured in an SAP R/3 environment.

Figure 11:
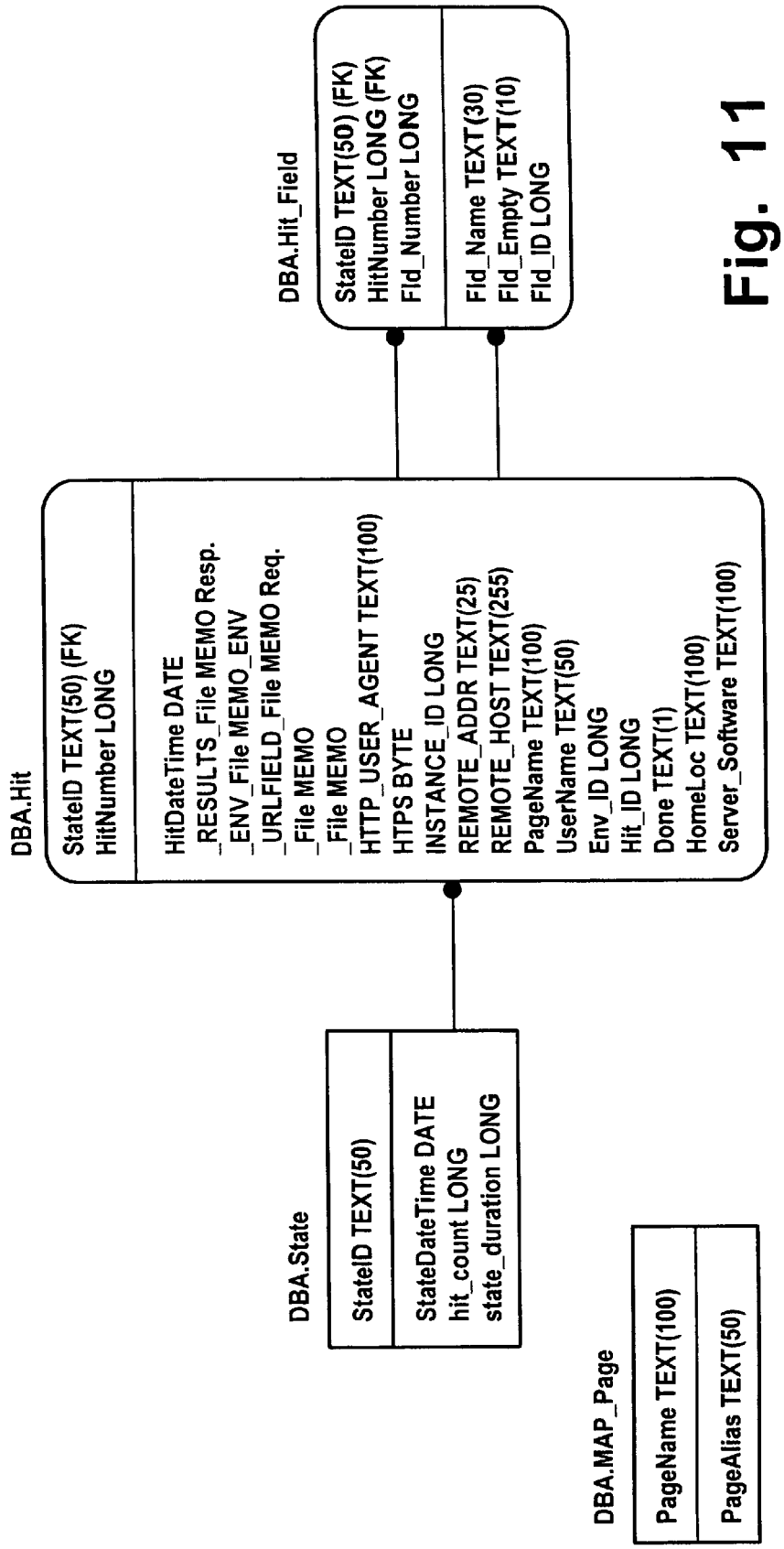
FIG. 11 illustrates a viewer table data structure for an internet based environment according to one embodiment of the present invention.
Figure 12:
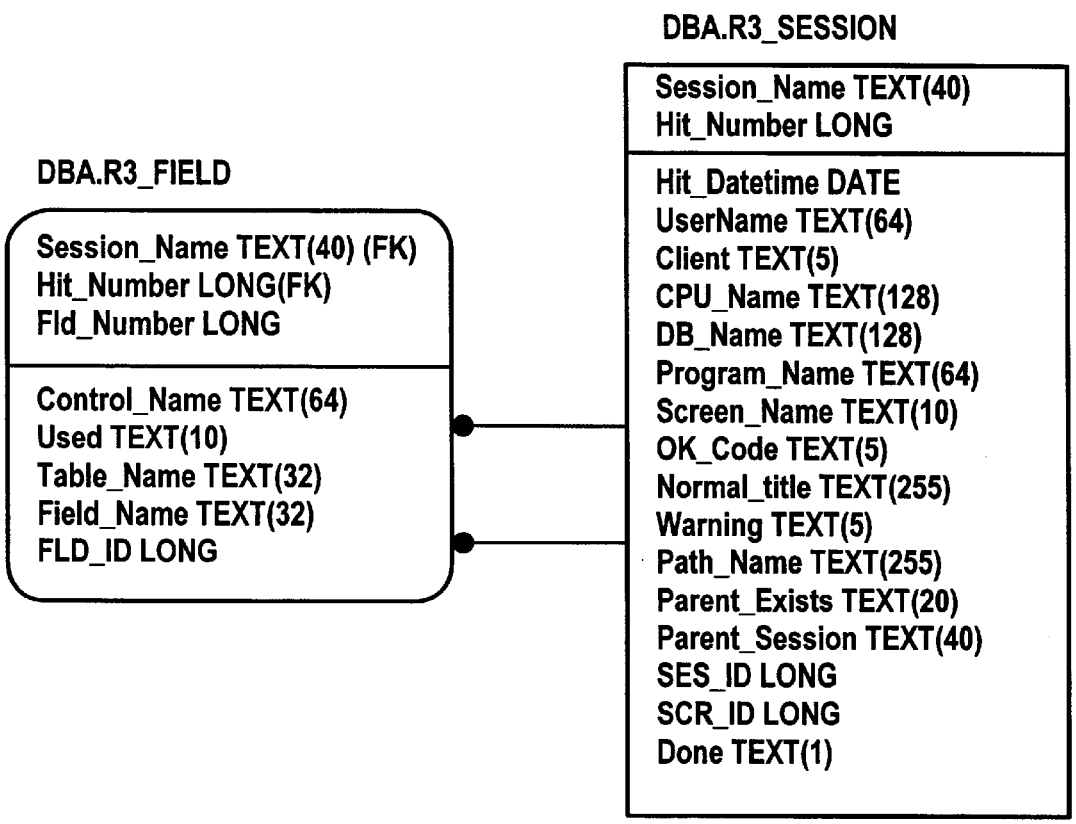
FIG. 12 illustrates a viewer table data structure for an SAP R/3 environment according to one embodiment of the present invention.

The second set of tables in analyzer database 630 are referred to as session viewer/analysis tables. Session viewer/analysis tables are designed and optimized for visually recreating user session 130 and for doing session-specific analysis. Session viewer/analysis tables include all of the hit information as well as information about the creation of available sessions and information extracted from the session identification. FIG. 11 illustrates a preferred embodiment for a viewer table for hits captured in the Internet or Web-based environment, while FIG. 12 illustrates a preferred embodiment for a viewer table for hits captured in an SAP R/3 environment.

Figure 13:
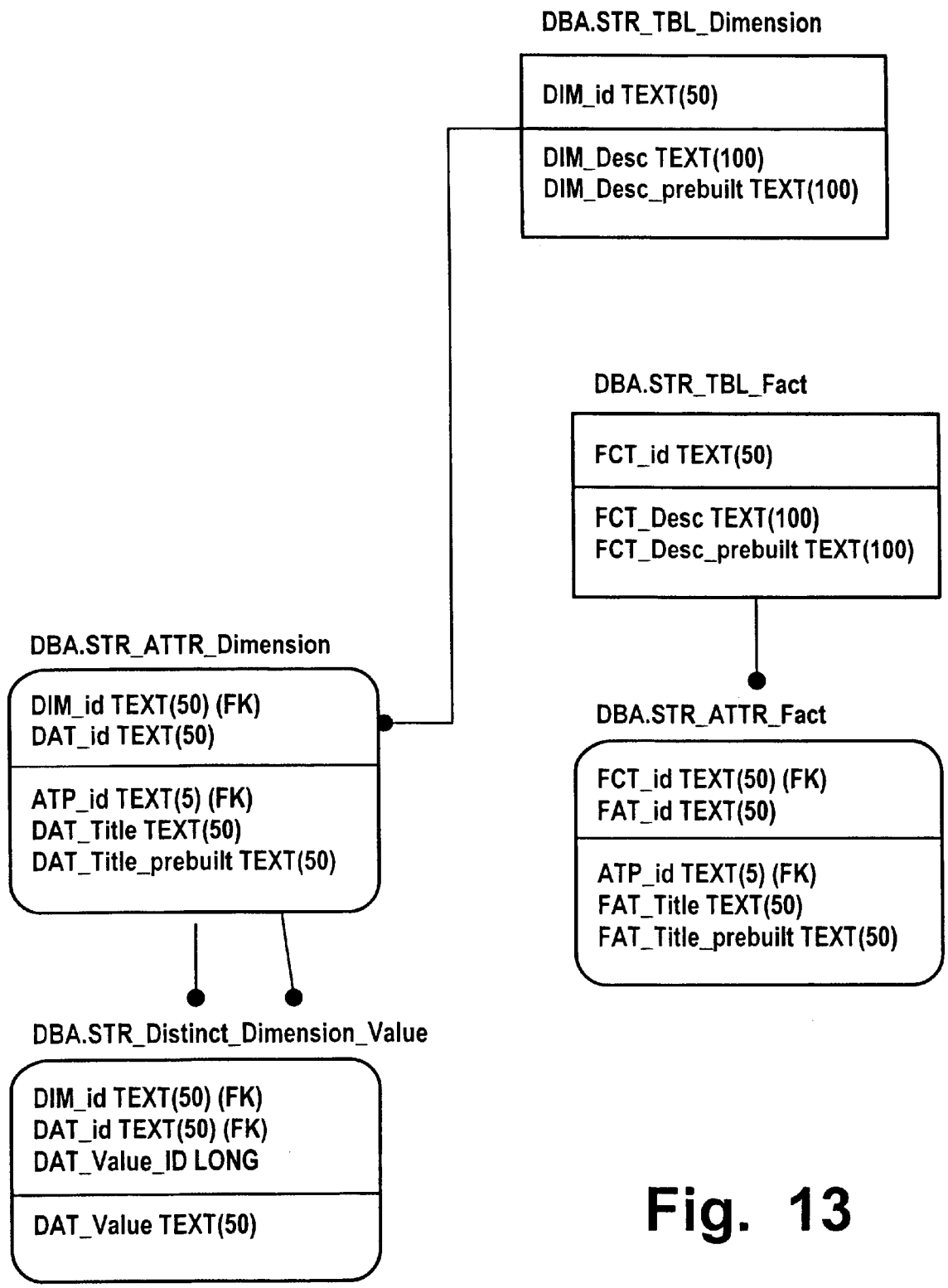
FIG. 13 illustrates a dimension buffer data structure according to one embodiment of the present invention.

FIG. 13 illustrates a dimension buffer data structure according to one embodiment of the present invention. The dimension buffer data structure is useful for speeding OLAP analysis as would be apparent.

In one embodiment of the present invention, import module 640 also stores information from auditor storage 160 into an archive (not shown). The archive is preferably a more permanent storage device. The information stored in the archive may be the raw data as it is stored in auditor storage 160, or it may be data from auditor storage 160 that is stripped of extraneous information not associated with the function or operation of analyzer 220. In either case, the information stored in archive is indexed according to the session identification number associated with each user session 130. Because each session identification is unique and non-reputable, the archive can store user sessions 170 from a variety of sources and a variety of applications without a risk of conflict resulting in the loss of data.

Figure 7:
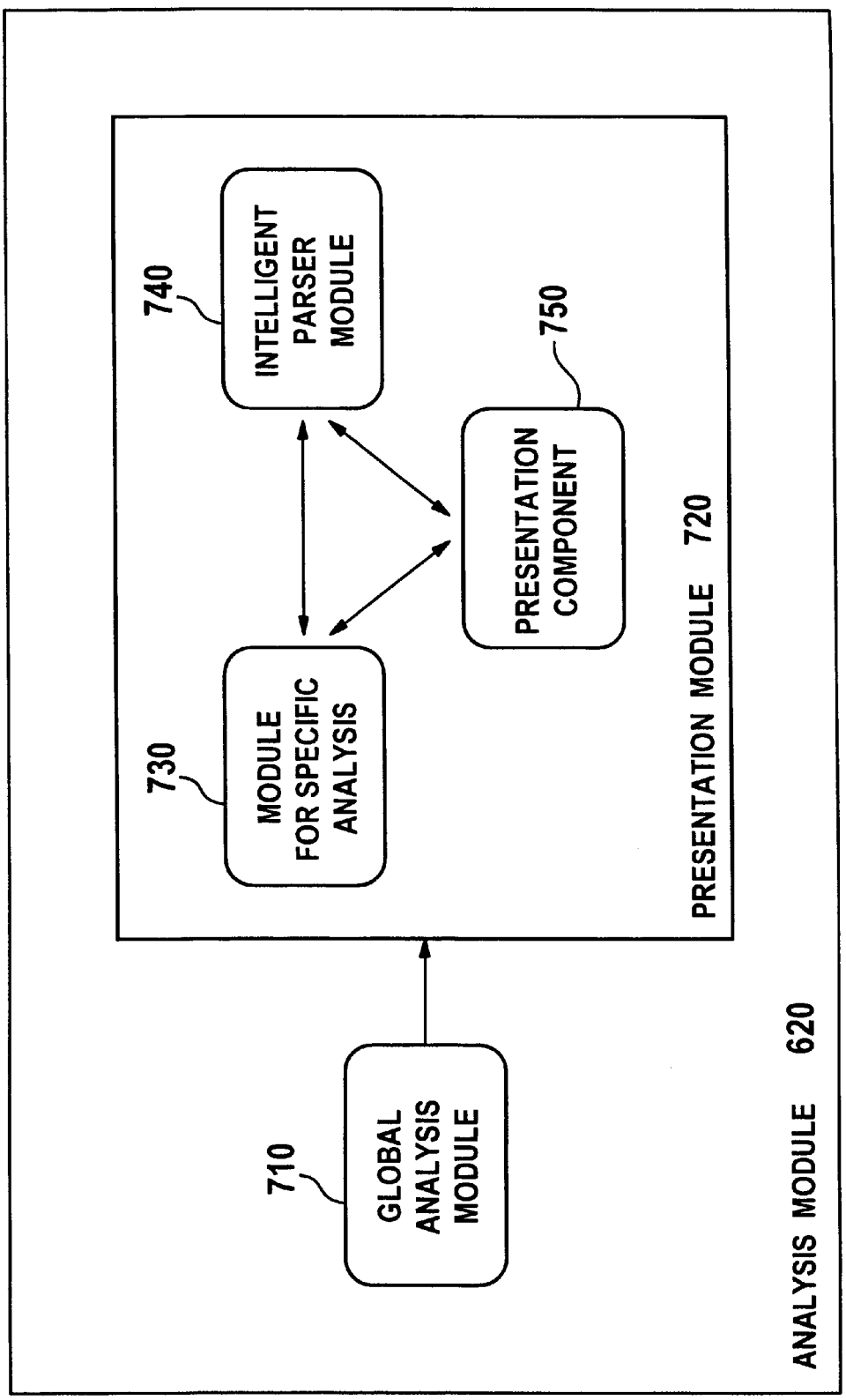
FIG. 7 illustrates an analyze module according to a preferred embodiment of the present invention in further detail.

Analyze module 620 is now described in further detail with reference to FIG. 7. Analyze module 620 includes a global analysis module 710 and a viewer module 720. Viewer module 720 includes a specific analysis module 730, an intelligent parser module 740, and a viewer component 750.

Global analysis module 710 allows analyst 210 to dynamically analyze user sessions 170 stored in analyzer database 630 from various clients 110, server environments 140, and various applications running in client/server environment 100. For example, global analysis module 710 permits analyst 210 to analyze user sessions 170 for all clients 110 that accessed a particular site in server environment 140. In another example, global analysis module 710 permits analyst 210 to analyze user sessions 170 for a particular client 110 that accessed multiple sites in different server environments 140. In yet another example, global analysis module 710 permits analyst 210 to analyze all user sessions 170 that resulted in a purchase of goods on a particular day for all clients 110 and all server environments 140. These are merely examples of how global analysis module 710 might access analyzer database 630 and are limited only by the information available in analyzer database 630 itself.

Viewer module 720 is responsible for visually recreating a particular user session 130, for performing session level analysis, and for presenting it to analyst 210. As mentioned above, viewer module 720 includes specific analysis component 730, intelligent parser module 740, and viewer component 750. Specific analysis component 730 is responsible for constantly providing statistical information associated with a particular dynamically generated screen 120 and the environmental data associated with that screen at the time it was generated and/or displayed to client 110. In a preferred embodiment of the present invention, specific analysis component 730 also calculates congestion in client/server environment 100 on server environment 140 or on communication link 125 at the time the screen 120 was provided to client 110 by server environment 140.

Viewer component 750 is responsible for physically displaying user session 170. In particular, viewer component 750 provides analyst 210 with means to move through user session 170 as well as to display statistics provided by specific analysis module 730. In a preferred embodiment of the present invention, for each particular client/server application, a separate viewer component 750 exists. For HTML and XML, viewer component 750 is comprised of a web browser. For SAP R/3, viewer component 750 is comprised of a modified version of a front end used by SAP R/3. For other application, viewer component 750 comprises an appropriate viewing program as would be apparent. In other words, a specific viewer component 750 is used depending on the particular client/server application.

Intelligent parser module 740 scans analyzer database 630 to determine if it includes HTML. If so, intelligent parser module 740 will determine if the HTML has any fields in it to allow intelligent parser module 740 to securely change the value of the fields upon a subsequent user request 134. In this manner, analyst 210 is able to view data entered by client 110 on the dynamically generated screen 120 as it occurred during user session 130. In a preferred embodiment of the present invention, intelligent parser module 740 does not implement this functionality for password fields for security reasons, as would be apparent.

As thus described, the present invention stores all requests 134 and responses 132 that occur between client 110 and server environment 140. However, this approach is not required and furthermore may not be desired, in all client/server environments 100. In alternate embodiments of the present invention, auditor capture filter 150 may only store requests 134 and responses 132 into auditor storage 160 when a significant event occurs. For example, in one embodiment of the present invention, requests 134 and responses 132 are stored in auditor storage 160 only if a purchase was completed. In this example, the purchase is a significant event. In another embodiment of the present invention, significant events may be further broken down. For example, one set of session data is stored for clients 110 that purchase $10 million or more worth of goods, while another set of session data is stored for clients 110 that purchase less than $10 million worth of goods. This embodiment of the present invention eliminates much of the data from auditor storage 160 associated with "surfing" or "browsing" or other insignificant events that might otherwise be stored. However, as would be apparent, in other embodiments of the present invention, such "surfing" or "browsing" data may be useful to determine usage patterns (i.e. shopping patterns) and should be stored in auditor storage 160. The specific significant events that trigger the storage of session data in auditor storage 160 can vary from application to application, as would be apparent.

In the embodiments of the present invention that use such significant events as a criteria for storing session data, requests 134 and responses 132 are preferably stored in a temporary memory until the particular significant event occurs. Once the significant event occurs, requests 134 and responses 132 would be transferred from the temporary memory into auditor storage 160. This process of transferring requests 134 and responses 132 from temporary memory into auditor storage 160 is referred to as "committing" requests 134 and responses 132 to auditor storage 160. Other mechanisms for committing the session data (i.e., requests 134 and responses 132) to auditor storage 160 are available as would be apparent. For example, session data could be stored in auditor 160 prior to the significant event and would be marked or otherwise indicated as being temporary or uncommitted. Once the significant event occurs, this data would be marked as committed. If the significant event does not occur, this data would be subsequently deleted or erased.

Figure 8:
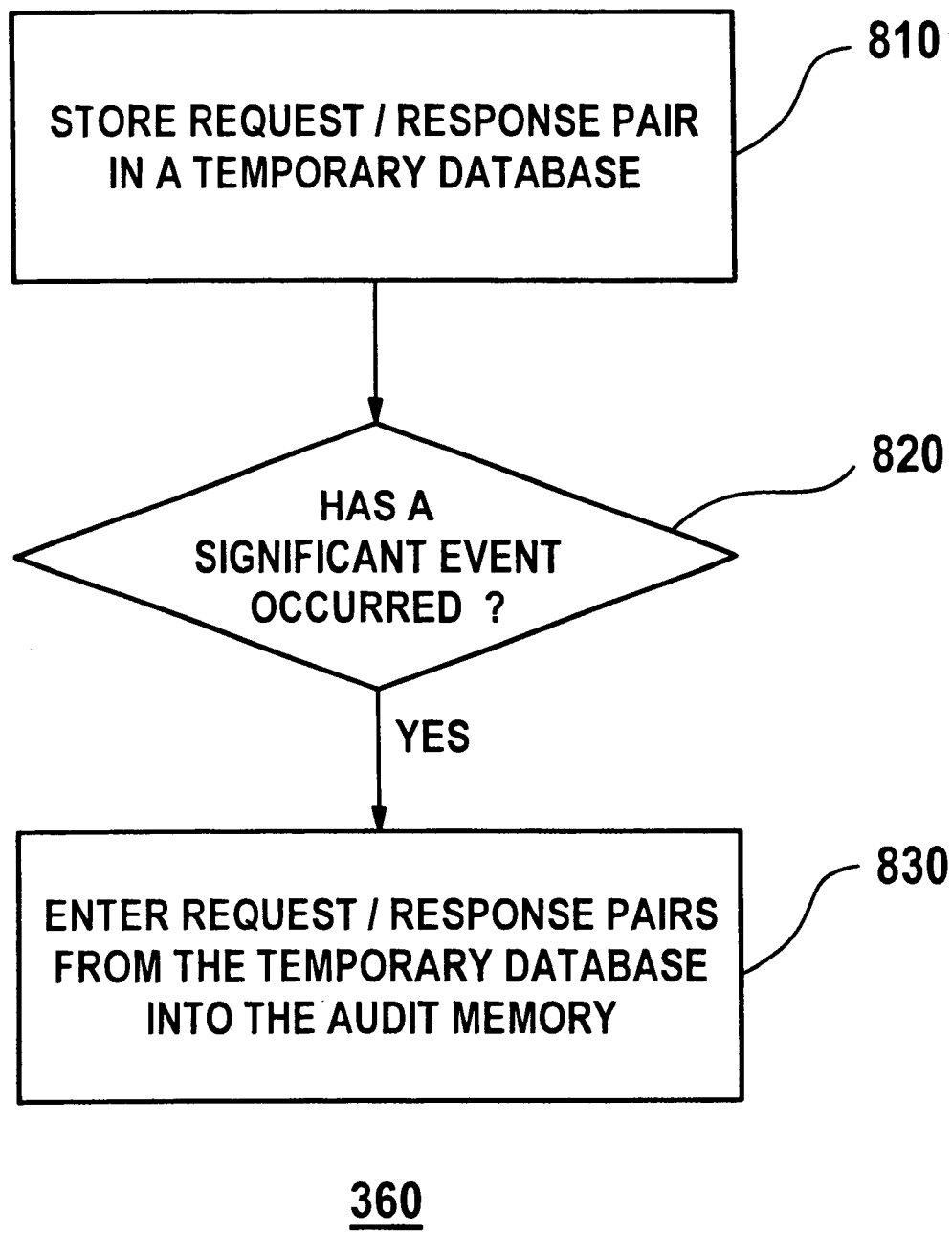
FIG. 8 is a flowchart that illustrates the step of storing data in auditor storage according to one embodiment of the present invention.

With this in mind, the operation of storing step 360 according to this embodiment of the present invention is now described with reference to FIG. 8. In a step 810, auditor capture filter 150 stores a request/response pair in a temporary database or other temporary memory. In a decision step 820, auditor capture filter 150 determines whether a significant event occurred. If the significant event occurred, in a step 830, auditor capture filter 150 commits the request/response pairs stored in the temporary database or temporary memory to auditor storage 160. At some point, if the temporary database or temporary memory was not committed, auditor capture filter 150 would delete such temporary database or temporary memory.

Figure 14:
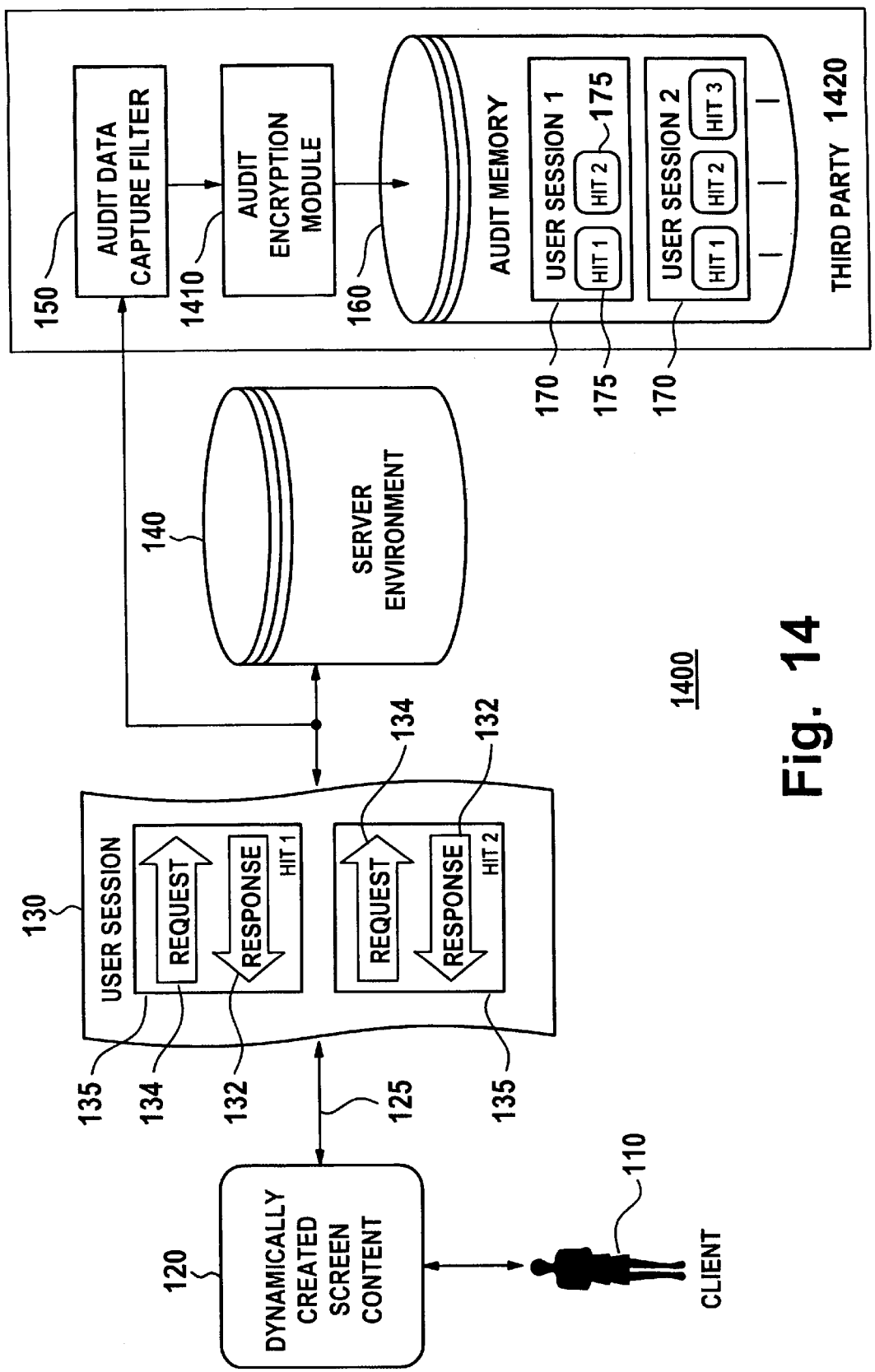
FIG. 14 illustrates an embodiment of the present invention capturing and encrypting session data in a client/server environment.

An embodiment of the present invention that uses encryption to protect data stored in auditor storage 160 is now described with reference to FIGS. 14–18. FIG. 14 illustrates a client/server environment 1400 where encryption is used to protect the data stored in auditor storage 160. In addition to the elements discussed above with respect to client/server 100, client/server environment 1400 includes an auditor encryption module 1410 and in one embodiment of the present invention, a trusted third party 1420.

In one embodiment of the present invention, auditor capture filter 150 monitors communication link 125 to capture communications (i.e., requests 134 and responses 132) between client 110 and server environment 140. As before, auditor capture filter 150 captures request 134 from client 110 to server environment 140 and captures response 132 from server environment 140 to client 110. Rather than storing captured request 134 and captured response 132 in auditor storage 160, auditor capture filter 150 passes captured request 134 and captured response 132 to auditor encryption module 1410. Auditor encryption module 1410 encrypts captured request 134 and captured response 132 to protect the privacy of communications and provide security during a particular user session 130 between client 110 and server environment 140. Auditor encryption module 1410 stores encrypted request 134 and encrypted response 132 in auditor storage 160 as described above.

In a preferred embodiment of the present invention, the encryption is carried so that neither client 110 nor server environment 140 can decrypt encrypted requests 134 and encrypted responses 132 without the consent or cooperation of the other. This embodiment not only provides privacy and security of the communication between client 110 and server environment 140, it also provides a mechanism whereby client 110 and server environment 140 can each verify that a particular course of events or transactions occurred during a particular user session 130. These features are discussed in further detail below.

Figure 15:
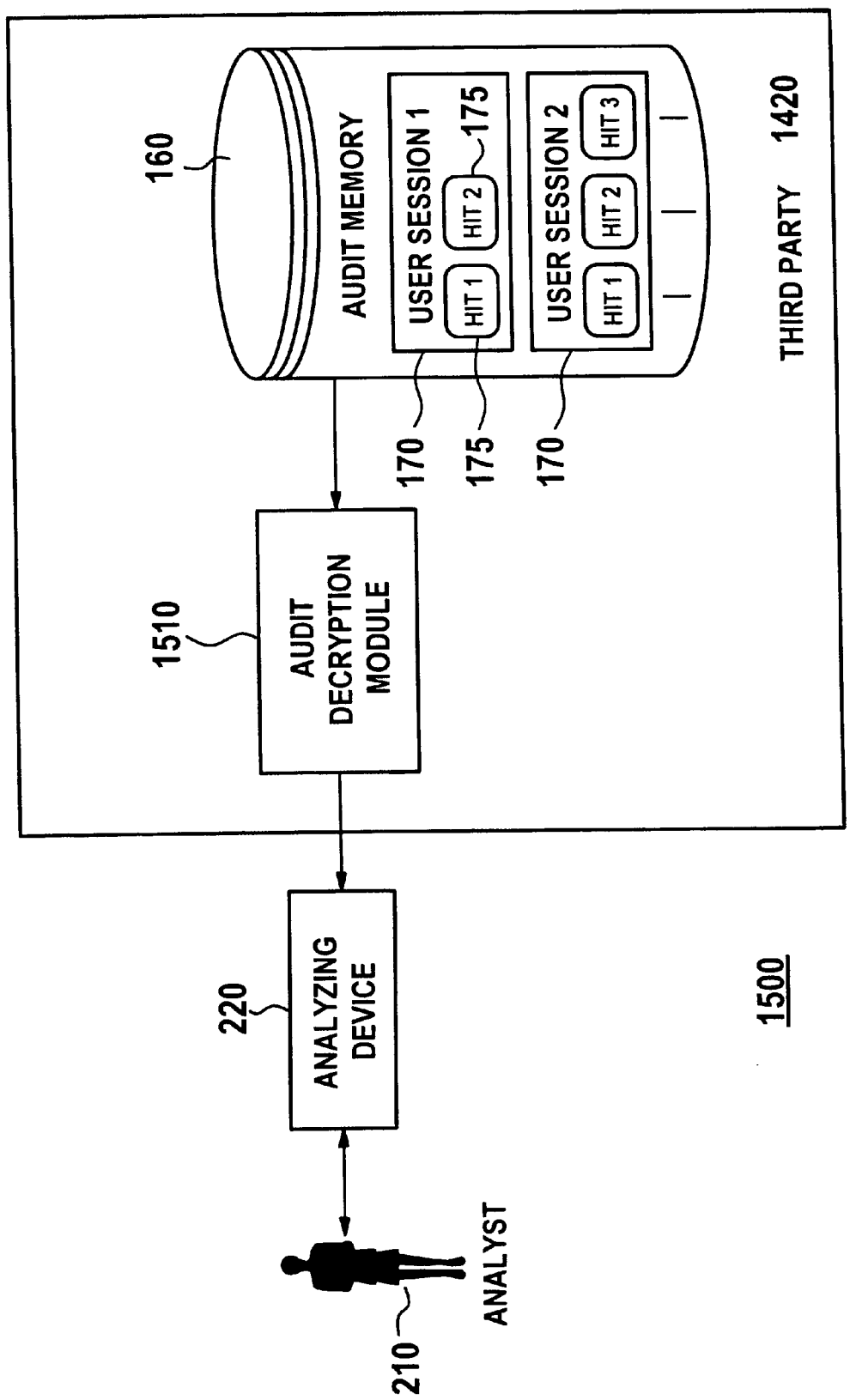
FIG. 15 illustrates an embodiment of the present invention decrypting and analyzing captured session data in an auditing environment.

Accessing encrypted requests 134 and encrypted responses 132 is now discussed with reference to FIG. 15. In order to access encrypted requests 134 and encrypted responses 132 in auditor storage 160, analyzer 220 must first access an auditor decryption module 1510 in order to analyze user session 170. In particular, analyst 210 must determine or obtain a decryption key that can be used to decrypt user session 170. Once the decryption key is recovered, auditor encryption module 1510 can decrypt the encrypted user session 170 thereby permitting requests 134 and responses 132 included therein to be analyzed as discussed above. As described herein, in some embodiments of the present invention, the decryption key and the encryption key are equivalent. Thus, these terms are often used interchangeably. As would be apparent, the present invention also applies to embodiments where the encryption key and decryption key are not equivalent.

Various encryption/decryption schemes have been developed and are well known in the art of cryptography. Any of these schemes can be used to provide encryption and/or decryption keys for use in the present invention as would be apparent.

Figure 16:
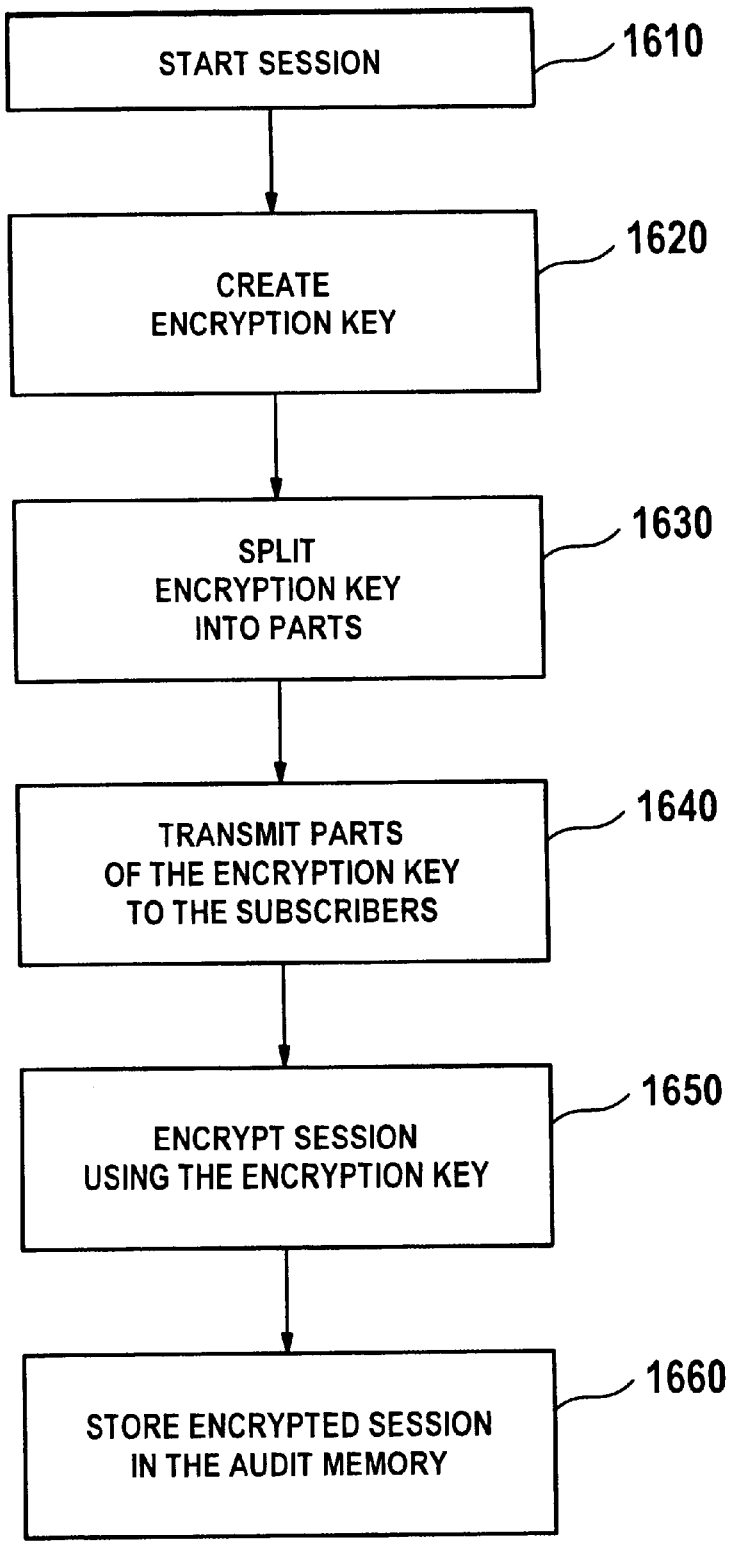
FIG. 16 illustrates the operation of the auditor encryption module according to one embodiment of the present invention.

FIG. 16 illustrates the operation 1600 of encrypting a user session 130 according to one embodiment of the present invention. In a step 1610, a client 110 initiates a session 130 with a server environment 140. This is accomplished, for example in an Internet application, by client 110 initially accessing a particular URL associated with server environment. Typically, this comprises a first request 134 from client 110 to server environment 140. Auditor capture filter 150 determines that first request 134 does not belong to another existing user session 130 and indicates to auditor encryption module 1510 that a new user session 130 has been initiated.

Once a new user session 130 has been initiated, auditor encryption module 1510 generates an encryption key in a step 1620 according to various well known methods of encryption as would be apparent. In a step 1630, the encryption key is broken into two or more portions. This is also accomplished by various well known methods so that the encryption key can only recovered from all the portions, or in some cases, from a majority of the portions. For example, in one embodiment of the present invention, the encryption key comprises a string which can be broken into two or more string portions. In this embodiment, the string portions can be recombined to recover the encryption key. In another embodiment, the encryption key comprises a value from which the portions can be computed. In this embodiment, the encryption key can be computed from the portions and thereby recovered. As would be apparent, in some embodiments of the present invention, the portions of the encryption key are determined first and the encryption key is subsequently determined from the portions. Other mechanisms can also be used as would be apparent.

In a step 1640, the portions of the encryption key are distributed to the participants in user session 130. In one embodiment of the present invention, a first portion of the encryption key is distributed to client 110 and a second portion is distributed to server environment 140. In embodiments of the present invention where multiple clients 110 are involved in a user session 130 with server environment 140, the encryption key is broken into as many portions as there are participants in the user session 130 including server environment 140 and distributed accordingly so that each participant is provided with a portion of the encryption key.

The portions of the encryption key may be distributed in several different ways. In one embodiment, the portions of the encryption key are distributed electronically to the participants in a secure or private communication channel. In another embodiment of the present invention, the portions of the encryption key are physically distributed to the participants via postal mail or other such communication method. Various other methods of distributing the portions of the encryption key are available as would be apparent.

In addition to distributing the portion of the encryption key to each of the participants, in one embodiment of the present invention, auditor encryption module 1410 also provides each participant with identifying information whereby a particular encrypted user session 170 associated with the portion of the encryption key can be located. In one embodiment of the present invention, the encryption key itself is sufficient to identify the particular encrypted user session 170 with which it is associated. In other embodiment of the present invention, a user session identifier that identifies the particular encrypted user session 170 is provided to the participant with the portion of the encryption key. In yet other embodiments, information used in Internet Protocols (e.g., a "cookie") can be used to identify the particular encrypted user session 170. Various other methods of identifying the particular encrypted user session 170 are available as would be apparent.

In a step 1650, auditor encryption module 1410 encrypts user session 130 using the encryption key generated in step 1620. In a step 1660, the encrypted user session 170 is stored in auditor storage 160. In one embodiment of the present invention, the encrypted user session 170 is stored in auditor storage 160 with identifying information so that the encrypted user session can be located as discussed above.

The purpose of distributing portions of the encryption key to the various participants in user session 130 as discussed above with reference to step 1640 is to ensure that no single participant can access the encrypted user session 170 without the consent or knowledge of the other participants. In operation, the present invention functions as a safety deposit box of sorts. In order to access the contents of the safety deposit box, two keys are required: one held by the bank and one held by the owner of the contents in the safety deposit box. Neither the bank nor the owner alone can access the contents of the safety deposit box; the cooperation of both is required.

In one embodiment of the present invention, client 110 and server environment 140 each has a public/private key pair. In this embodiment of the present invention, the respective public keys (which are known widely, hence "public") are used to individually and successively encrypt user session 130. For example, a request 130 is first encrypted by a public key associated with client 110, and the resulting encryption is encrypted by a public key associated with server environment 140. In this embodiment, the private keys of both client 110 and server 140 are used to recover request 130.

Figure 17:
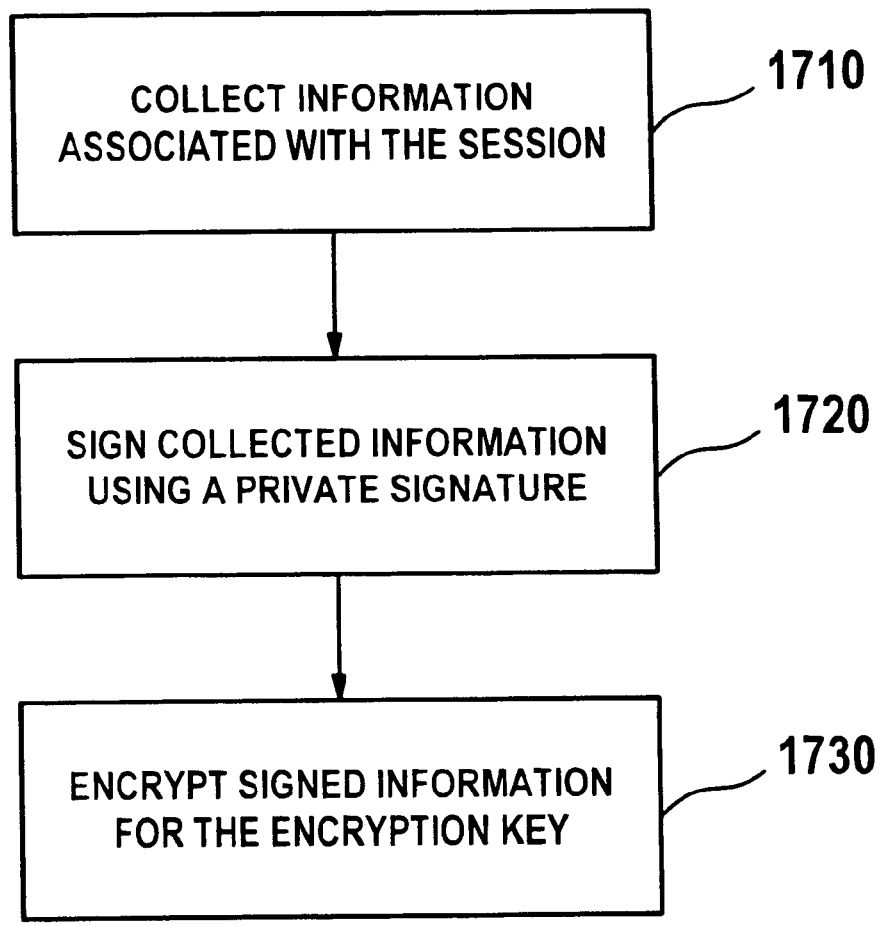
FIG. 17 illustrates the operation of the step of generating an encryption key according to a preferred embodiment of the present invention.

FIG. 17 illustrates the operation of step 1620 in further detail according to a preferred embodiment of the present invention. In particular, FIG. 17 illustrates one embodiment of how an encryption key is generated. In a step 1710, once a user session 130 has been initiated, auditor encryption module 1410 collects information pertaining to user session 130. This information is dependent upon the application and may include an IP addresses for client 110, and IP address for server environment 140, a date and/or time stamp of request 134, a username, and/or other information associated with user session 130 as would be apparent. This information is collected and placed together as a string referred to herein as a collected information string.

In a step 1720, auditor encryption module 1410 signs the collected information string with a private signature according to well known methods. In a step 1730, the collected information string is encrypted into the final encryption key. As would be apparent, the order in which step 1720 and step 1730 are performed may be reversed. The final encryption key, which is a string in the preferred embodiment of the present invention, is the encryption key subsequently used to encrypt user session 130.

Figure 18:
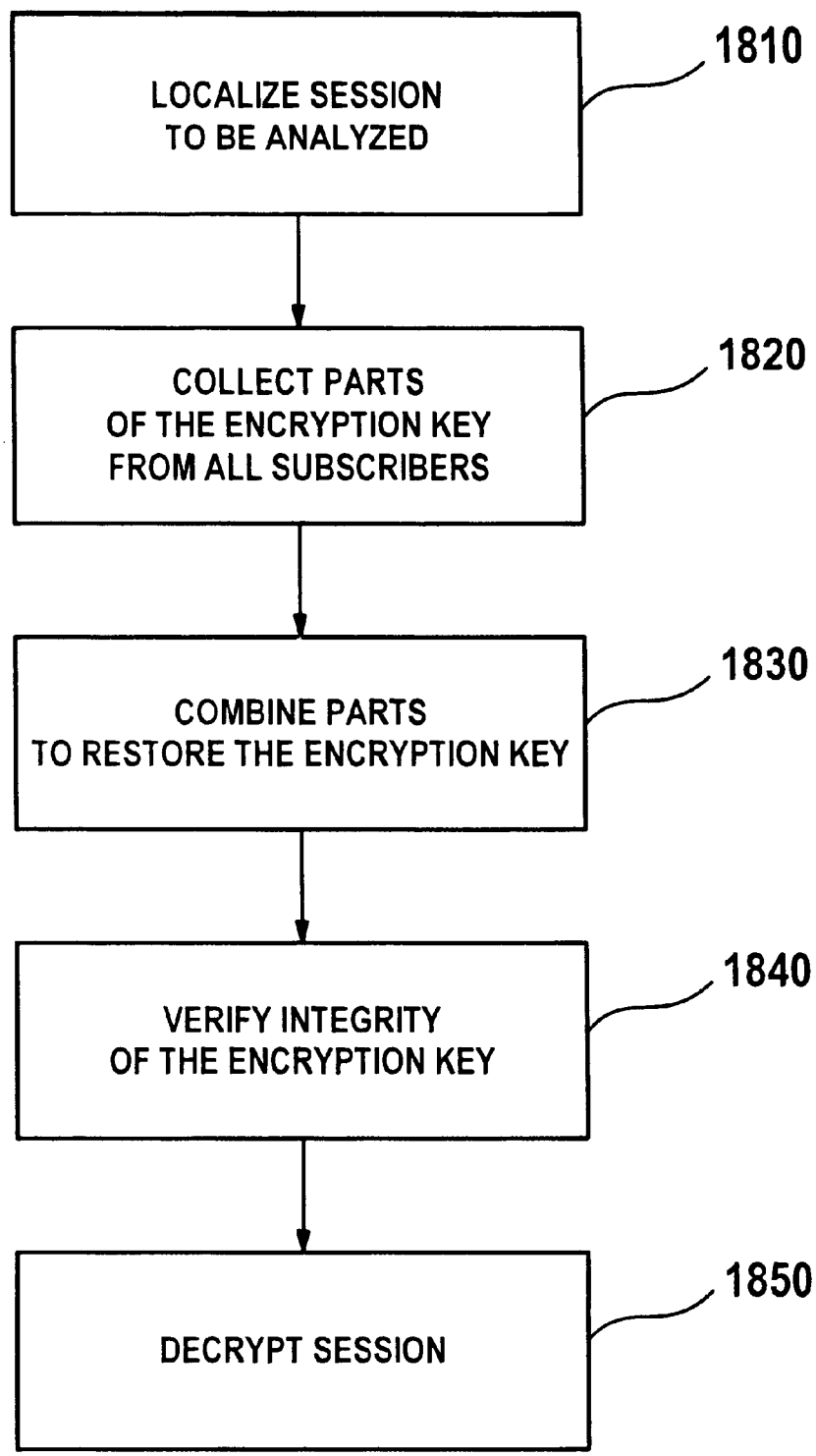
FIG. 18 illustrates the operation of the auditor decryption module according to one embodiment of the present invention.

The operation of auditor decryption module 1510 is now described in reference to FIG. 18. In a step 1810, auditor decryption module 1510 locates the user session 170 that analyst 210 wishes to analyze. In one embodiment of the present invention, analyst 210 presents some identifying information to auditor decryption module 1510 that permits auditor decryption module 1510 to locate the particular encrypted user session 170 that analyst 210 wishes to analyze. In one embodiment of the present invention, the identifying information may be the portion of the encryption key itself. Other embodiments use other identifying information as discussed above.

In a step 1820, auditor decryption module 1510 collects the portions of the encryption key from all the participants associated with encrypted user session 170. As discussed above, auditor decryption module 1510 must collect the respective portion of the decryption key from each of the participants (or in some embodiments, from majority of the participants).

In a step 1830, the portions of the encryption key are combined to recover the encryption key. As discussed above, in embodiments using a string for an encryption key, the portions are strung together to recover the encryption key, whereas in embodiments using a value for an encryption key, the encryption key is computed from the portions.

In a step 1840, auditor decryption module 1510 verifies the integrity of the encryption key and the integrity of the encrypted user session 170 to ensure that tampering has not occurred using various well known methods.

In a step 1850, auditor decryption module 1510 uses the encryption key to decrypt the encrypted user session 170. Once user session 170 is decrypted, analyst 210 is able to analyze requests 134 and responses 132 as discussed above.

Rather than, or in addition to, encrypting an entire user session 130 as described above, various embodiments of the present invention can be used to encrypt and store particular events that occurred during user session 130. These embodiments of the present invention are referred to in the context of event verification. Event verification provides a secure and verifiable mechanism for demonstrating that a particular event occurred during user session 130. For example, in an electronic purchase of goods, it may be useful for either side of the purchase transaction to prove that the transaction occurred. By encrypting and storing request 132 that included "I agree to buy X widgets at a price of D dollars per unit," either side, upon presenting auditor decryption module 1510 with an appropriate portion of an encryption key, can later demonstrate that the transaction occurred. Event verification might be useful, for example, in encrypting and storing significant events as discussed above.

Figure 19:
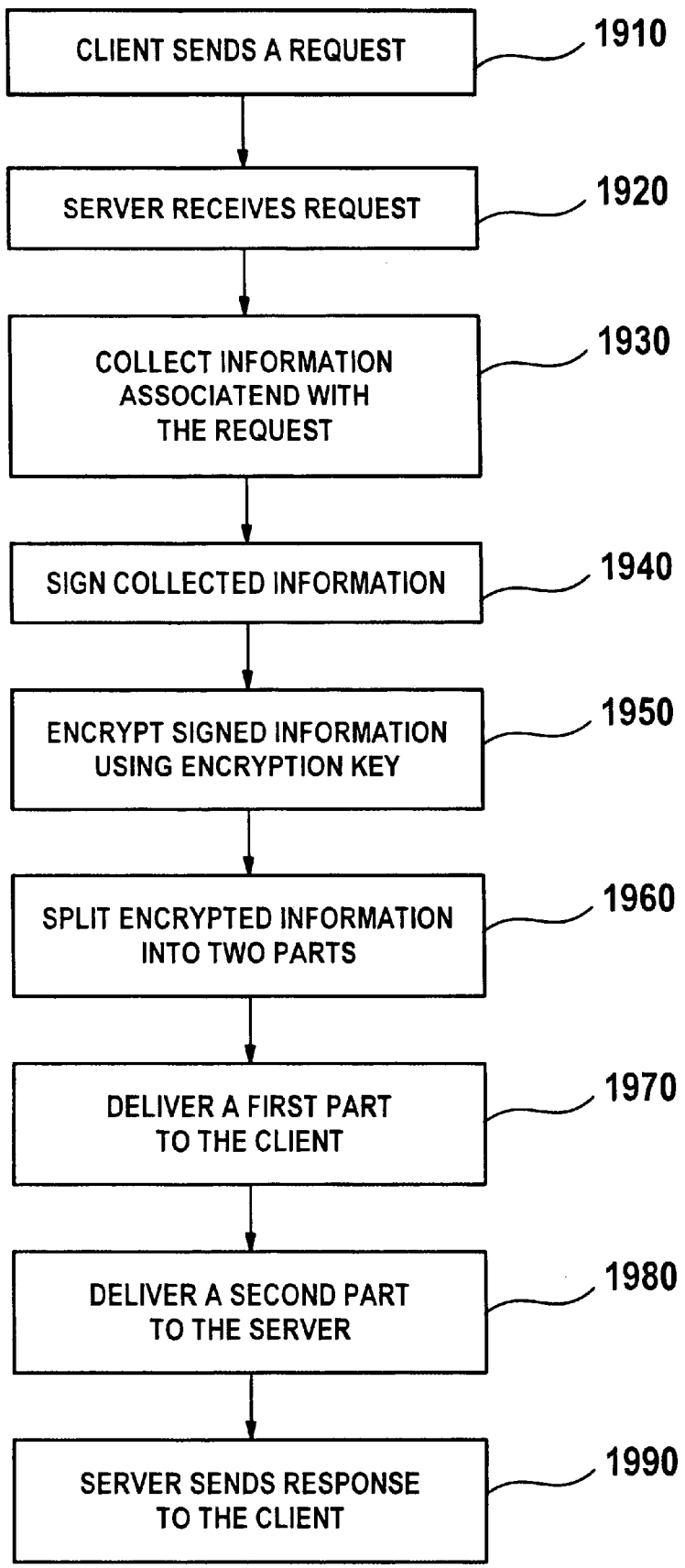
FIG. 19 illustrates the operation of event verification according to one embodiment of the present invention.

The operation of event verification according to a preferred embodiment of the present invention is now described with reference to FIG. 19. In a step 1910, a client 110 sends a request 134 to a server environment 140. In one embodiment of the present invention, request 134 includes a significant event, e.g., "I agree to purchase." In other embodiments, each request 134 in user session 130 may be processed as described herein.

In a step 1920, server environment 140 (shown as "SERVER" in FIG. 19) receives request 134. In a step 1930, server environment 140 collects information pertaining to the received request 134 as described above with reference to step 1710. In a step 1940, server environment 140 signs the collected information as described above with reference to step 1720. By signing the collected information, receipt of request 134 is acknowledged by server environment 140 thereby preventing subsequent forgery attacks by a party adverse to server environment 140 as would be apparent.

In a step 1950, server environment 140 encrypts the signed information as described above with respect to step 1730. In a step 1960, sever environment splits the encrypted information into two (or more) portions as described above. In a step 1970, server environment 140 provides a first portion of the encrypted information to client 110. In a step 1980, server environment 140 provides a second portion of the encrypted information to auditor storage 160 to record the event for its own purposes. In another embodiment of the present invention, server environment 140 stores both the first and second portions of the encrypted information in auditor storage 160. In a step 1990, server environment 140 sends a response 132 to client 110 in response to request 134 as described above.

Figure 20:
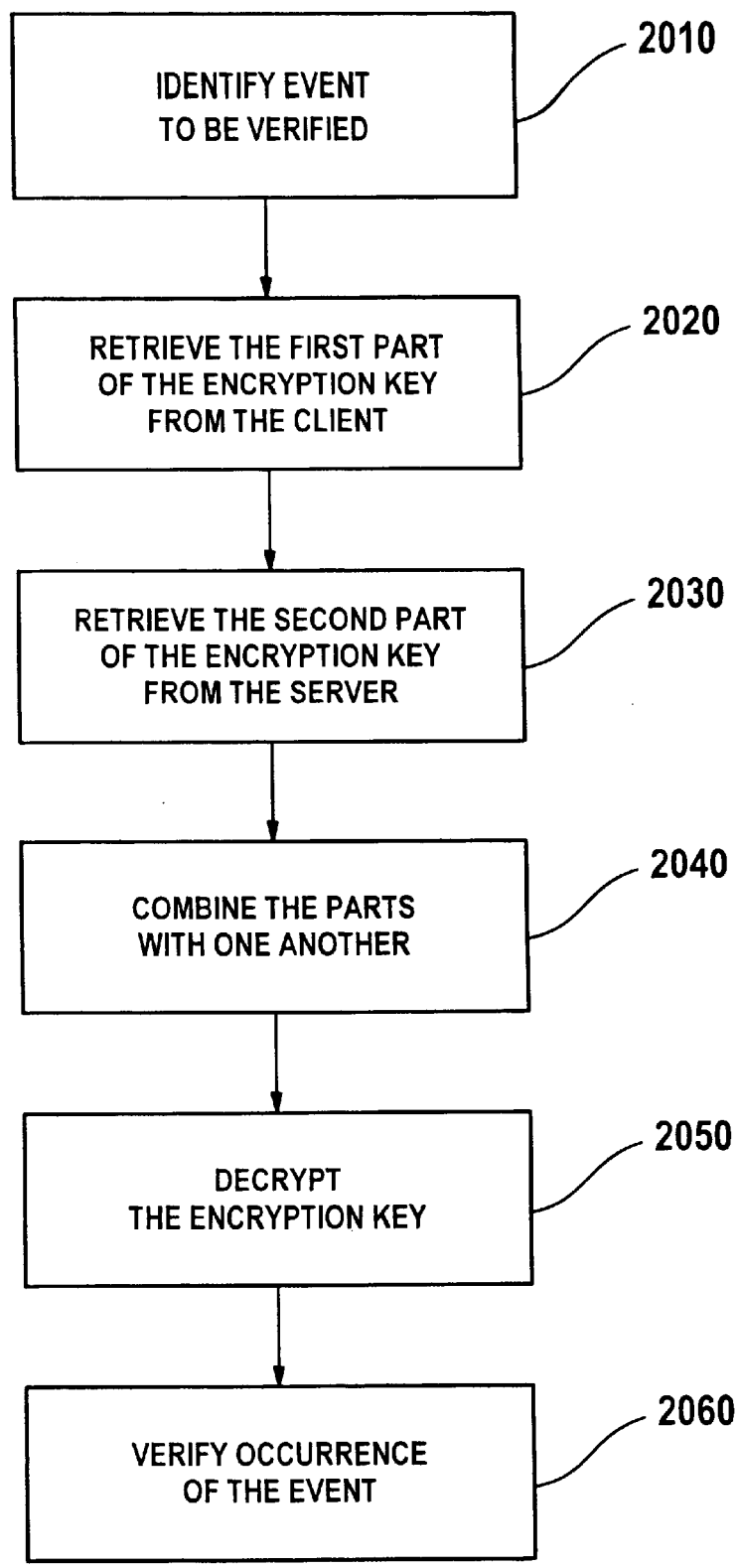
FIG. 20 further illustrates the operation of event verification according to one embodiment of the present invention.

The operation of event verification is now further described with respect to FIG. 20. In a step 2010, server environment 140 identifies an event to be verified. For example, a client 110 might wish to confirm that he placed an order on a particular date. Server environment 140 would search auditor storage 160 based on identifying information such as an IP address, a date, a transaction type or other such identifying information as discussed above. Alternately, the identifying information may be the first portion of the encryption key provided to client 110 in step 1970 as discussed above.

In a step 2020, server environment 140 retrieves the first portion of the encryption key from client 110. In a step 2030, server environment 140 retrieves the second portion of the encryption key from auditor storage 160. In a step 2040, server environment 140 combines the two portions of the encryption key. In a step 2050, server environment 140 decrypts the encryption key to obtain the signed information. In a step 2060, server environment 140 uses the signed information to verify that a particular event occurred, namely, that client 110 sent a particular request 134.

FIGS. 14–20 were described above in the context of server environment 140 performing various operations associated with generating keys, encrypting information, decrypting information, etc. In this context, it is assumed that server environment 140 is trustworthy. In other words, server environment 140 will not perform any action or operation that would tend to subvert the intended operation of the present invention (e.g., forge events, provide incorrect portions of the encryption key, provide false information regarding events, etc.)

However, this assumption may not be valid for server environments 140. For example, clients 110 may not trust server environment to act fairly or honestly in all situations. In some embodiments of the present invention, an independent trusted third party (such as that shown in FIGS. 14 and 15 as third party 1420) may be used. In these embodiments of the present invention, the operations and functions of auditor encryption module 1410 and auditor decryption module 1510, in particular, are performed by third party 1420. For example, third party 1420 would perform the operations of generating an encryption key, breaking the encryption key into portions, distributing the portions of the encryption key to the participants, and encrypting the user session (steps 1620–1650 in FIG. 16); collecting the portions of the encryption key from the participants, combining the portions to recover the encryption key, verifying the integrity of the encryption key and the encrypted session, and decrypting the encryption key (steps 1820–1850 in FIG. 18); encrypting the signed information with an encryption key, splitting the encryption key into two portions, sending a first portion to the client (steps 1950–1970 in FIG. 19); and retrieving the portions of the encryption key from the client and the server environment, combining the portions to recover the encryption key, decrypting the encryption key, and verifying that a particular event occurred (steps 2020–2060 in FIG. 20) This list is not intended to be exclusive of the steps performed by third party 1420. Rather, the list is exemplary of the steps that third party 1420 might perform according to the present invention. These steps illustrate the steps that a client 110 might not trust a server environment 140 to perform, particularly in situations adverse, or potentially adverse, to server environment 140. In any case, it would be apparent how the present invention thus described could be modified to incorporate third party 1420.

One advantage of using third party 1420 is achieved by having third party 1420 store all the portions of the encryption key and/or the encryption key itself. In this way, third party 1420 can always recover the encrypted session 170, or portions thereof, if the portions of the encryption key provided to client 110 or server environment 140 are lost or either participant refuses to cooperate.

The description of the present invention also assumes that requests 134 can always be attributed to a particular client 110. In fact, in actual operation, requests 134 can only be definitively attributed to a particular computer or terminal. In particular, in an IP environment, requests 134 can be identified as having originated at a particular IP address which uniquely corresponds to a particular computer, while in a dedicated environment, requests 134 can be identified as having originated from a particular terminal. Thus, additional security protocols such as passwords, security cards, fingerprint scans, retinal scans, etc., that effectively restrict access to a particular computer or terminal are required so that a request 134 from the same can be undeniably attributed to a particular client 110 as would be apparent.

While the invention has been described in detail and with reference to specific embodiments thereof, it will be apparent to one skilled in the art that various changes and modifications can be made therein without departing from the spirit and scope thereof. Thus, it is intended that the present invention cover the modifications arid variations of this invention provided they come within the scope of the appended claims and their equivalents.

What is claimed is:

1. A method for recording a user session in a computer environment including a client and a server, the user session comprising at least one request and at least one response between the client and the server, the method comprising:

receiving at least one request from the client at the server;

capturing at the server the at least one request and first environmental data associated with the computer environment;

capturing at the server at least one response to the at least one request sent from the server to the client and second environmental data associated with the computer environment; and encrypting the user session based on a client key and a server key such that neither the client nor the server can decrypt the user session without the consent of the other.

2. The method of claim 1, further comprising:

verifying that the user session has not been tampered with.

3. The method of claim 2, further comprising:

decrypting the user session based on the client key and the server key; and recreating the user session at the server.

4. A method for recording a user session in a computer environment including multiple clients and a server, the user session comprising requests and responses between the clients and the server, the method comprising:

receiving requests from the clients at the server;

capturing at the server the requests and first environmental data associated with the computer environment;

capturing at the server responses to the requests sent from the server to the clients and second environmental data associated with the computer environment;

encrypting the user session based on a key;

separating the key into key parts; and distributing to each client and the server a different key part, such that the user session cannot be decrypted without the participation of all clients and the server.

5. The method of claim 4, further comprising;

providing each client and the server with identifying information for locating each client and the server.

6. The method of claim 5, further comprising:

verifying that the user session has not been tampered with.

7. The method of claim 5, further comprising:

collecting the different key parts from the clients and the server;

decrypting the user session based on the client key and the server key; and recreating the user session at the server.

8. A system for recording a user session in a computer environment including a client and a server comprising:

a communication link between the client and the server, a memory, and an auditor capture filter capable of receiving at least one request from the client at the server;

capturing at the server the at least one request and first environmental data associated with the computer environment;

capturing at the server at least one response to the at least one request sent from the server to the client and second environmental data associated with the computer environment; and encrypting the user session based on a client key and a server key such that neither the client nor the server can decrypt the user session without the consent of the other.

9. The system of claim 8, wherein the auditor capture filter is further capable of:

verifying that the user session has not been tampered with.

10. The system of claim 8, wherein the auditor capture filter is further capable of:

decrypting the user session based on the client key and the server key; and recreating the user session at the server.

11. A system for recording a user session in a computer environment including a client and a server comprising:

a communication link between the client and the server, a memory, and an auditor capture filter capable of receiving requests from the clients at the server;

capturing at the server the requests and first environmental data associated with the computer environment;

capturing at the server responses to the requests sent from the server to the clients and second environmental data associated with the computer environment;

encrypting the user session based on a key;

separating the key into key parts; and distributing to each client and the server a different key part, such that the user session cannot be decrypted without the participation of all clients and the server.

12. The system of claim 11, wherein the auditor capture filter is further capable of:

providing each client and the server with identifying information for locating each client and the server.

13. The system of claim 11, wherein the auditor capture filter is further capable of:

verifying that the user session has not been tampered with.

* * * * *